US009538249B2

United States Patent
Dankberg et al.

(10) Patent No.: US 9,538,249 B2
(45) Date of Patent: Jan. 3, 2017

(54) CLOSE FULFILLMENT OF CONTENT REQUESTS

(71) Applicant: ViaSat Inc., Carlsbad, CA (US)

(72) Inventors: Mark D. Dankberg, Encinitas, CA (US); Daniel M. Newman, Littleton, MA (US)

(73) Assignee: ViaSat Inc., Carlsbad, CA (US)

( * ) Notice: Subject to any disclaimer, the term of this patent is extended or adjusted under 35 U.S.C. 154(b) by 105 days.

(21) Appl. No.: 13/890,971

(22) Filed: May 9, 2013

(65) Prior Publication Data
US 2014/0337875 A1   Nov. 13, 2014

(51) Int. Cl.
| H04N 7/10 | (2006.01) |
| H04N 21/4784 | (2011.01) |
| H04N 21/25 | (2011.01) |
| H04N 21/472 | (2011.01) |

(52) U.S. Cl.
CPC ........ *H04N 21/4784* (2013.01); *H04N 21/251* (2013.01); *H04N 21/47202* (2013.01)

(58) Field of Classification Search
CPC .................... H04N 21/23424; H04N 21/44016
USPC .................................................... 725/32–36
See application file for complete search history.

(56) References Cited

U.S. PATENT DOCUMENTS

| 5,925,100 A | 7/1999 | Drewry et al. |
| 6,959,319 B1 | 10/2005 | Huang et al. |
| 7,080,158 B1 | 7/2006 | Squire |
| 8,595,613 B1 | 11/2013 | Mills et al. |
| 9,154,436 B2 | 10/2015 | Dankberg et al. |
| 2002/0071395 A1 | 6/2002 | Redi et al. |
| 2002/0073167 A1 | 6/2002 | Powell et al. |
| 2002/0133637 A1 | 9/2002 | Popp et al. |
| 2002/0150094 A1 | 10/2002 | Cheng et al. |
| 2003/0069964 A1 | 4/2003 | Shteyn et al. |
| 2004/0042479 A1 | 3/2004 | Epstein et al. |
| 2004/0267880 A1 | 12/2004 | Patiejunas |
| 2005/0198315 A1 | 9/2005 | Wesley et al. |

(Continued)

OTHER PUBLICATIONS

Non-Final Office Action mailed in U.S. Appl. No. 14/047,091, on Aug. 25, 2016, 20 pgs.

*Primary Examiner* — Junior Mendoza
(74) *Attorney, Agent, or Firm* — Marsh Fischmann & Breyfogle LLP; Daniel J. Sherwinter

(57) ABSTRACT

Systems and methods are described for subscriber-driven resource shifting in an attempt to maximize delivery of desirable content to subscribers while minimizing the impact of that content delivery to network infrastructure resources. When a media plan subscriber requests access to media content, and the requested object is determined not to be "watch-nowable" (e.g., it would be undesirable to deliver the object in substantially real time to the subscriber given present communications resource availability) embodiments identify a number of content objects that are presently watch-nowable content objects with respect to the requesting subscriber. Of those watch-nowable content objects, various techniques are presented for determining a set of alternate content objects, including those most likely to provide the subscriber with a similar level of engagement. Embodiments present those alternate content objects to the requesting subscriber as alternatives to the requested content object in exchange for a discount.

27 Claims, 8 Drawing Sheets

(56) References Cited

U.S. PATENT DOCUMENTS

| | | |
|---|---|---|
| 2007/0239611 A1 | 10/2007 | Blum |
| 2008/0037554 A1 | 2/2008 | Vincent et al. |
| 2008/0155613 A1 | 6/2008 | Benya et al. |
| 2008/0320222 A1 | 12/2008 | Dhodapkar |
| 2009/0287772 A1 | 11/2009 | Stone et al. |
| 2010/0185729 A1 | 7/2010 | Lord et al. |
| 2010/0192097 A1 | 7/2010 | Brugler et al. |
| 2011/0067067 A1* | 3/2011 | Ellis ................................ 725/50 |
| 2011/0252438 A1 | 10/2011 | Tremblay et al. |
| 2011/0299544 A1* | 12/2011 | Lundgren .............. G06Q 20/10 370/401 |
| 2012/0066583 A1 | 3/2012 | Priestley et al. |
| 2012/0078703 A1* | 3/2012 | Berger et al. .............. 705/14.27 |
| 2012/0131096 A1 | 5/2012 | Bugenhagen |
| 2012/0144117 A1 | 6/2012 | Weare et al. |
| 2013/0014186 A1* | 1/2013 | Thomas et al. ................. 725/87 |
| 2013/0066464 A1* | 3/2013 | Maskatia et al. ............. 700/234 |
| 2013/0080180 A1* | 3/2013 | Foladare ............ G06Q 30/0601 705/1.1 |
| 2013/0111526 A1* | 5/2013 | Glowaty et al. ................ 725/53 |
| 2014/0040787 A1 | 2/2014 | Mills et al. |
| 2014/0164586 A1 | 6/2014 | Dankberg et al. |
| 2014/0245364 A1* | 8/2014 | Ramakrishnan et al. ...... 725/97 |
| 2014/0269484 A1 | 9/2014 | Dankberg et al. |
| 2014/0289764 A1* | 9/2014 | Mallika ........................... 725/34 |
| 2016/0191405 A1 | 6/2016 | Dankberg et al. |

\* cited by examiner

US 9,538,249 B2

CLOSE FULFILLMENT OF CONTENT REQUESTS

FIELD

Embodiments relate generally to communications systems, and, more particularly, to content offer and request handling via communications systems.

BACKGROUND

Users of communications services are increasingly accessing media content over data communications networks, like the Internet, through content service providers (e.g., media aggregator websites), web portals, games, and/or other user interfaces. Even television interfaces commonly include interactive electronic program guide interfaces that can facilitate access to linear, on-demand, and locally-stored media content. Media content providers can use these interfaces and various marketing and incentive techniques to help users find and access desirable content, thereby increasing profitability, advertising opportunities, etc.

This increasing demand for media content also yields an increased demand for bandwidth resources of the underlying communications infrastructures. In some cases, communications service providers attempt to combat ever-increasing demands on their networks through increased prices, resource throttling, limitations on service offerings, etc. However, it can be preferable in other cases to better utilize available resources to satisfy the increasing demands. For example, bandwidth resources can often be more fully utilized through time- and/or demand-shifting techniques.

BRIEF SUMMARY

Among other things, systems and methods are described for subscriber-driven resource shifting in an attempt to maximize delivery of desirable content to subscribers while minimizing the impact of that content delivery to network infrastructure resources. When a media plan subscriber requests access to media content, and the requested object is determined not to be "watch-nowable" (e.g., it would be undesirable to deliver the object in substantially real time to the subscriber given present communications resource availability) embodiments identify a number of content objects that are presently watch-nowable content objects with respect to the requesting subscriber. Of those watch-nowable content objects, various techniques are presented for determining a set of alternate content objects, including those most likely to provide the subscriber with a similar level of engagement. Embodiments present those alternate content objects to the requesting subscriber as alternatives to the requested content object in exchange for a discount.

According to one set of embodiments, a method is provided for resource shifting in a communications infrastructure having a provider-side system in communication with subscriber-side systems over at least one shared communications link. The method includes: receiving a request for a content object via a requesting one of the subscriber-side systems; calculating a request engagement relationship between the requested content object and a number of content objects determined to be watch-nowable content objects with respect to the requesting subscriber-side system, each watch-nowable content object having an associated content engagement relationship between itself and others of the watch-nowable content objects; determining a set of alternate content objects including those of the watch-nowable content objects having content engagement relationships most similar to the request engagement relationship of the requested content object; and communicating, to a subscriber via the requesting subscriber-side system, an offer of a discount in exchange for the subscriber opting for delivery of one of the set of alternate content objects instead of opting for delivery of the requested content object.

According to another set of embodiments, a provider-side system is provided for resource shifting in a communications infrastructure. The provider-side system is in communication with a number of subscriber-side systems over at least one shared communications link and includes an offer generation subsystem. The offer generation subsystem is configured to: calculate a request engagement relationship between a requested content object and a number of content objects determined to be watch-nowable content objects with respect to the requesting subscriber-side system, a request for the requested content object being received from one of the subscriber-side systems, and each watch-nowable content object having an associated content engagement relationship between itself and others of the watch-nowable content objects; determine a set of alternate content objects comprising those of the watch-nowable content objects having content engagement relationships most similar to the request engagement relationship of the requested content object; and communicate, to a subscriber via the requesting subscriber-side system, an offer of a discount in exchange for the subscriber opting for delivery of one of the set of alternate content objects instead of opting for delivery of the requested content object.

According to another set of embodiments, a method is provided for resource shifting in a communications infrastructure having a provider-side system in communication with a plurality of subscriber-side systems. The method includes: receiving a request for a content object from a subscriber via a one of the plurality of subscriber-side systems associated with the subscriber; communicating the request for the content object from the requesting subscriber-side system to a provider-side system; receiving, at the requesting subscriber-side system from the provider-side system in response to the request, an offer of a discount in exchange for the subscriber opting for delivery of one of a set of alternate content objects instead of opting for delivery of the requested content object, the offer generated by: calculating a request engagement relationship between the requested content object and a plurality of watch-nowable content objects, wherein the watch-nowable content objects are determined to be watch-nowable content objects with respect to the requesting subscriber-side system, and each of at least some of the watch-nowable content objects has an associated content engagement relationship between itself and others of the plurality of watch-nowable content objects; and determining the set of alternate content objects as comprising those of the plurality of watch-nowable content objects having content engagement relationships most similar to the request engagement relationship of the requested content object.

In some such embodiments, the request for the content object is received via a graphical user interface displayed on a subscriber interface device of the requesting subscriber-side system; and the offer is communicated to the subscriber via the graphical user interface. In other such embodiments, the offer is generated at least in part by the requesting subscriber-side system. Still other such embodiments further include: receiving a substitute request for a selected one of the alternate content objects from the subscriber at the subscriber-side system in response to the offer; communicating the substitute request from the requesting subscriber-side system to the provider-side system; and receiving the selected one of the alternate content objects at the requesting subscriber-side system from the provider-side system in response to the substitute request. Yet other such embodiments further include: receiving a substitute request for a selected one of the alternate content objects from the subscriber at the subscriber-side system in response to the offer; determining that the selected one of the alternate content objects is presently stored in a local cache of the requesting subscriber-side system; and delivering the selected one of the alternate content objects to the subscriber via the local cache of the requesting subscriber-side system in response to the substitute request. And other such embodiments further include: receiving a substitute request for a selected one of the alternate content objects from the subscriber at the subscriber-side system in response to the offer; determining that a first portion of the selected one of the alternate content objects is presently stored in a local cache of the requesting subscriber-side system; delivering the first portion of the selected one of the alternate content objects to the subscriber via the local cache of the requesting subscriber-side system in response to the substitute request; and receiving a second portion of the selected one of the alternate content objects from the provider-side system in response to the substitute request.

According to another set of embodiments, a subscriber-side system is provided. The system includes: a consumer premises equipment (CPE) that receives a request for a content object from a subscriber; and a communications subsystem that: communicates the request for the content object to a remote provider-side system over a communications infrastructure; and receives, from the provider-side system in response to the request, an offer of a discount in exchange for the subscriber opting for delivery of one of a set of alternate content objects instead of opting for delivery of the requested content object. The offer is generated by: calculating a request engagement relationship between the requested content object and a plurality of watch-nowable content objects, wherein the watch-nowable content objects are determined to be watch-nowable content objects with respect to the requesting subscriber-side system, and each of at least some of the watch-nowable content objects has an associated content engagement relationship between itself and others of the plurality of watch-nowable content objects; and determining the set of alternate content objects as comprising those of the plurality of watch-nowable content objects having content engagement relationships most similar to the request engagement relationship of the requested content object.

In some such embodiments, the offer is delivered to the subscriber via the CPE. Other such embodiments further include a subscriber-side optimizer subsystem that generates the offer at least in part. In still other such embodiments, the CPE further receives a substitute request for a selected one of the alternate content objects from the subscriber at the subscriber-side system in response to the offer; and the communications subsystem further communicates the substitute request to the provider-side system and receives the selected one of the alternate content objects from the provider-side system in response to the substitute request. Yet other such embodiments further include: a local cache (e.g., any suitable type of local content store) having a plurality of stored content objects; and a subscriber-side optimizer subsystem that receives a substitute request for a selected one of the alternate content objects from the subscriber in response to the offer, determines that the selected one of the alternate content objects is presently stored in the local cache, and delivers the selected one of the alternate content objects to the subscriber from the local cache in response to the substitute request. And other such embodiments further include: a local cache (e.g., any suitable type of local content store) having a plurality of stored content objects; and a subscriber-side optimizer subsystem that receives a substitute request for a selected one of the alternate content objects from the subscriber in response to the offer, determines that a first portion of the selected one of the alternate content objects is presently stored in the local cache, and delivers the first portion of the selected one of the alternate content objects to the subscriber from the local cache in response to the substitute request, wherein the communications subsystem receives a second portion of the selected one of the alternate content objects from the provider-side system in response to the substitute request.

BRIEF DESCRIPTION OF THE DRAWINGS

The present disclosure is described in conjunction with the appended figures.

Figure 1:
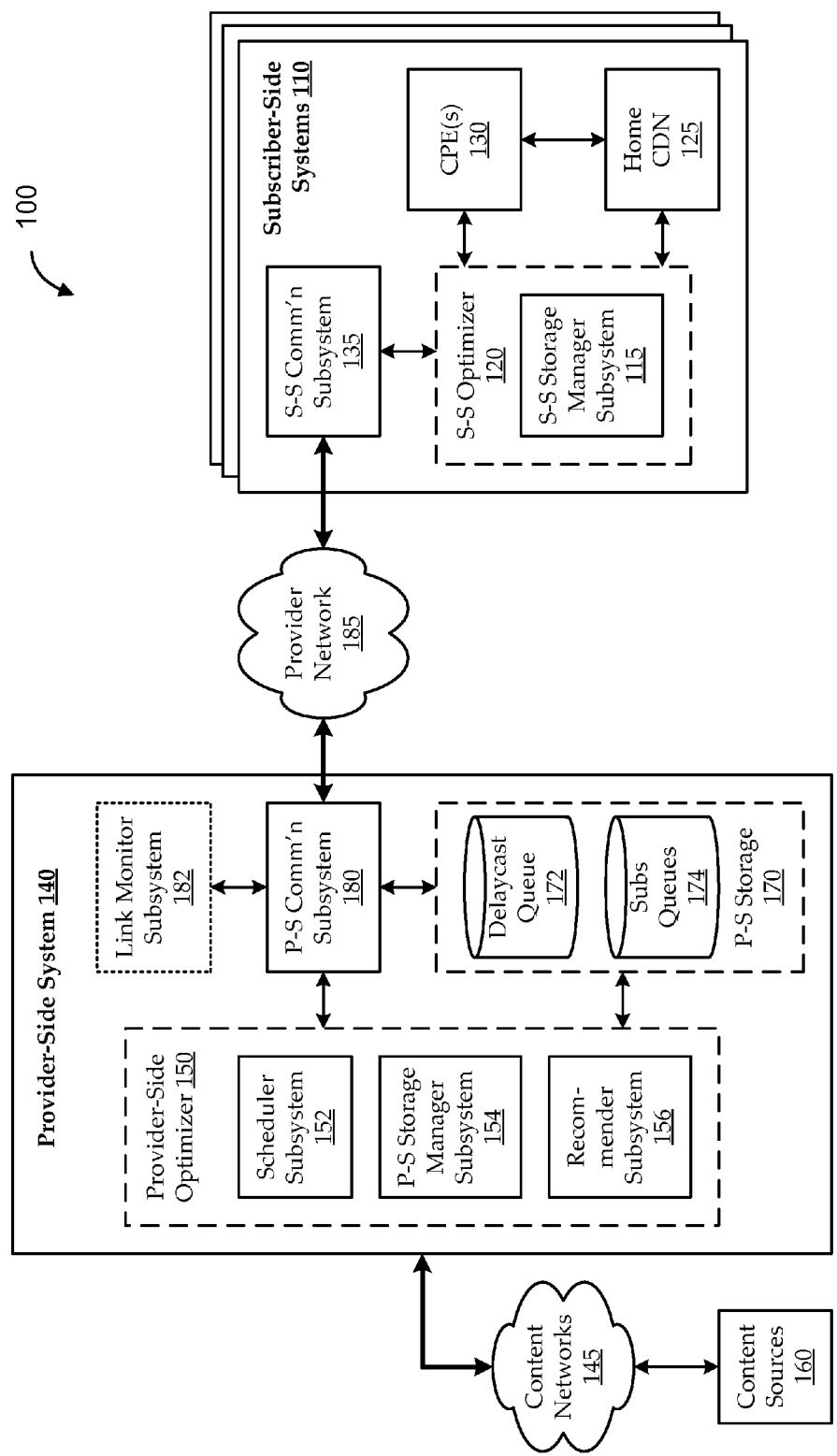
FIG. 1 shows a block diagram of an embodiment of a communications system having a provider-side system in communication with multiple subscriber-side systems over a provider network.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

As users of communications services desire more access to media content over data communications networks from more devices, providers of those services are seeking techniques for maximizing fulfillment of their customers' media demands without overloading their networks. Embodiments operate in the context of a media plan, through which subscribers are provided access to media content over a data communications infrastructure. Subscribers' usage of the media plan is governed by a data allowance policy (DAP) that can provide various details and/or policies concerning how much data (e.g., bandwidth, storage, etc.) is allowed to the subscriber, the cost of that data, restrictions on usage of that data, etc. When a subscriber requests access to particular content object (e.g., a movie object, other media object, or other type of content object), a determination is made as to whether the requested object can be delivered to the requesting subscriber now (e.g., substantially in real time via download, streaming, etc.) given present network resource conditions (e.g., link availability, cache contents, etc.). Other determinations are also made as to other media objects that could be delivered to that requesting subscriber substantially in real time, and which of those other media objects are good alternates to (e.g., similar to) the requested object. Where appropriate, (e.g., when it is not desirable to deliver the requested media object now, but the alternate media objects could be delivered now with appreciably less resource usage), an offer can be presented to the requesting subscriber to choose one of the alternate objects instead, for example, in exchange for a discount. Across the network, this can permit the provider to effectively fulfill more content requests with an appreciably smaller impact to infrastructure resources.

In the following description, numerous specific details are set forth to provide a thorough understanding of various embodiments. However, one having ordinary skill in the art should recognize that the invention can be practiced without these specific details. In some instances, circuits, structures, and techniques have not been shown in detail to avoid obscuring the present invention. While a number of embodiments are described with specific reference to "media," embodiments operate generally in context of any content, including, for example, software distribution, online periodical distribution (e.g., magazines, etc.), application distribution (e.g., apps, etc.), etc. Further, terms such as "optimize" or "maximize" are intended to connote a relative or desired outcome, rather than an absolute outcome, and should not be considered as limiting potential embodiments. For example, embodiments described with reference to optimization are intended to include even variations deemed to be sub-optimal. Further, a number of "opportunistic" techniques are described herein, and are intended broadly to include techniques for dynamically optimizing infrastructure resources based on present usage of those resources, for example, using opportunistic time shifting and/or opportunistic delay shifting techniques.

As used herein, the term DAP is intended broadly to include any type of policy or the like that governs a subscriber's usage of data as part of a subscription data service. In one example, the DAP provides a usage allowance per month (e.g., in exchange for a monthly subscription charge). Some DAPs are set up so that certain types of data usage falls outside the DAP. For example, the DAP does not apply to usage of certain data types (e.g., email) and/or usage during certain times of day (e.g., outside of peak hours). Other DAPs include different allowances, for example, for different types of data (e.g., streaming media has a first associated allowance, and non-real-time file transfers have a second associated allowance), different times of day, etc. The DAP can provide fixed, variable, dynamic, and/or any other suitable types of data allowances. Further, the allowance can be expressed in any suitable manner. For example, the allowance can be expressed in terms of bandwidth (e.g., a number of bytes of communications bandwidth, storage bandwidth, etc.), pricing (e.g., dollars, credits, and/or the like for media and/or other objects), number of objects (e.g., a number of movies, etc.), etc.

As described above, embodiments can offer delayed delivery of content in exchange for a reduced debit to the DAP. As used herein, terms like "debit," "hit," "cost," and the like are intended generally to include any suitable positive or negative impact to the subscriber that can be exchanged for opportunistically delayed delivery of requested content. For example, delivering content to a subscriber at the time it is requested (i.e., without appreciable delay) carries a particular "base cost" (or hit or debit). This can be a base price (e.g., amount of money), a base deduction from the subscriber's monthly data allowance, etc. In exchange for opportunistically delaying delivery of the content, the subscriber can be offered the content at a lower price, at a reduced (or zero) deduction from the subscriber's monthly data allowance, etc. Additionally or alternatively, the exchange can include a reduction in future bandwidth throttling associated with the subscriber, credits to the subscriber for future content requests, a reduction in ads associated with viewing the content, a change in rights management options associated with the content, additional access to promotional materials, and/or any suitable type of exchange.

Various embodiments are described herein with reference to subscriber engagement with content objects. As used herein, "subscriber engagement" (and, similarly, terms and phrases, like "engagement relationship," "engagement score," etc.) generally refers to a subscriber's (or a subscriber cluster's) interaction on one or more levels with a particular content object. A subscriber can engage with a content object at different levels, for example, by hovering over the object with a pointer device without selecting the object, by selecting the object without requesting the object (e.g., selecting the object to receive more information, like selecting a movie listing on a webpage to receive a more detailed description, a trailer, etc.), by requesting substantially real-time delivery of the object (e.g., by download, streaming, etc.), by requesting delayed delivery of the object without consuming (e.g., watching) the object, by consuming the object after it is opportunistically delivered, etc. Subscriber engagement can, in some instances, be considered a gauge of subscriber satisfaction or happiness. For example, if a subscriber desires to have access to any content of interest at any time, embodiments can seek to maximize subscriber engagement by determining how to fill the subscriber's local cache with content objects having the highest likelihood of engagement by the subscriber.

Turning first to FIG. 1, a block diagram is shown of an embodiment of a communications system 100 having a provider-side system 140 in communication with multiple subscriber-side systems 110 over a provider network 185. The provider network 185 can include one or more of any suitable type of communications link and can be part of one or more of any suitable type of network, including, for example, leased high-bandwidth lines (e.g., raw Ethernet), virtual private large-area network services (VPLS), Internet protocol virtual private networks (IP VPN), or other types of public or private, wired or wireless networks.

Some functionality exploits resource sharing over multiple communications links of the provider network 185 (e.g., multiple subscribers share link resources over one or multiple "shared communications links" of the provider network 185). Certain network architectures allow bandwidth resources to be shared through multicasting (e.g., including multicasting, point-to-multipoint, broadcasting, etc.) and/or other techniques. In one illustrative implementation, the communications system 100 is a satellite communications network with a provider-side system 140 (e.g., in a gateway or core node) in communication with subscriber terminals of subscriber-side systems 110 over satellite communications links (e.g., via carriers of spot beams of one or more satellites). For example, each communications link of the provider network 185 includes one or more antennas, satellites, etc. As communications are essentially broadcast from the satellite to the subscriber terminals, multicasting techniques can be used to communicate content once for receipt by multiple subscribers concurrently. Similar techniques can be used with certain other wireless communications link architectures. Some other wired infrastructures can also use similar techniques in shared portions of the network. For example, a cable network can be architected to have a shared pipe between a cable head-end and an intermediate node (e.g., a neighborhood aggregator), at which node the shared pipe splits into individual pipes (e.g., to each household). Resources of the shared pipe can often be shared using similar techniques to those described above.

Some embodiments are described herein with respect to downstream traffic and sharing of forward link bandwidth resources. Similar techniques can also be applied with respect to upstream traffic and/or sharing of return link resources. For example, certain media upload contexts, including peer-to-peer implementations, can exploit functionality described herein in a manner that shares return link bandwidth resources.

The provider-side system 140 is further in communication with one or more content sources 160 via one or more content networks 145. The content sources 160 can include content servers and/or other suitable sources. Further, the content networks 145 are intended generally to include any suitable public or private, wired or wireless (e.g., short-range or long range, cellular, satellite, etc.) network components, nodes, or networks used to deliver content to subscriber-side systems 110 via provider-side system 140. While the content sources 160 and content networks 145 are shown as separate from the provider-side system 140, they can be implemented in any suitable manner, including as part of the provider-side system 140. Some functionality described herein relates to provision of media content, such as movies, over the communications system 100. Accordingly, at least some of the content sources 160 are assumed to be sources of media content objects. For example, a content source 160 can be a content service provider website that provides users with access to movies, music, and/or other media over the Internet via their respective subscriber-side systems 110 and provider-side system 140.

Various types of functionality are described herein relating to communications between the provider-side system 140 on a provider side of the communications system 100 infrastructure and the one or more subscriber-side systems 110 on a subscriber side of the communications system 100 infrastructure. As illustrated, the provider-side system 140 includes a provider-side communications subsystem 180, and the subscriber-side systems 110 include subscriber-side communications subsystems 135. Each of the provider-side communications subsystem 180 and the subscriber-side systems 110 include functionality to support communications over the provider network 185, such as protocol support, service flow management, routing, etc. In some implementations, the provider-side system 140 can act substantially as a server and the subscriber-side systems 110 can act substantially as clients, and communications between the systems over the provider network 185 can be considered client-server communications over client-server links (e.g., persistent links between proxy clients and proxy servers). Accordingly, provider-side functions can be implemented as functions of server-side systems or components, service provider systems or components, gateways, head-ends, or the like without departing from embodiments. Similarly, subscriber-side functions can be implemented as functions of user-side systems or components, client-side systems or components, customer premises devices, subscriber modems, subscriber devices, or the like without departing from the scope of embodiments.

In some cases, various functions described herein are only available to subscribers of certain services from a service provider, such as subscribers to a media plan. The service provider can own and/or control some or all of the components that facilitate the functionality, such as the provider-side system 140. In some embodiments, the service provider can also own some or all of the content sources 160, subscriber-side systems 110, infrastructure components, etc. For example, a service provider offers certain functionality to subscribers by virtue of relationships with content providers, relationships with subscribers, ownership or control of provider-side systems, and ownership or control of certain subscriber-side devices.

In some instances, a single subscriber is associated with subscription services, and any subscriber-side devices used with those services are associated with that subscriber. In other instances, a single subscriber is associated with subscription services, but the subscriber can access services nomadically or otherwise, including through devices that are not associated with that subscriber (e.g., by logging in to a service, etc.). In still other instances, one or more subscribers are associated with subscription, but the media services can be accessed by additional users. For example, a subscriber can own a television through which subscription media services can be accessed by anyone in the house, including non-subscriber members of the household, guests, etc. In even other instances, one or more human or machine agents are associated with the subscriber and can interface with services on the subscriber's behalf. For example, a smart device disposed in the subscriber's network (e.g., integrated in or in line with the subscriber's modem, set-top box, etc.) can monitor user behavior and/or use other information to make smart requests for content on behalf of the subscriber. In some implementations, these smart requests can be considered by the provider just as any other explicit request by the subscriber. Accordingly, while certain functionality can be governed by (e.g., handled according to) a relationship between the subscriber and the provider, it is not always the subscriber (or a particular subscriber-associated device) that is interacting with, exploiting, and/or facilitating those services. Embodiments are intended generally to operate in and account for any of those scenarios, even though, for the sake of simplicity, embodiments are described with reference to the subscriber making content requests, interacting with subscription services via devices and interfaces, etc.

Further, various embodiments are described with reference to a "requesting" or "non-requesting" subscriber, or the like. These types of designations are intended only to suggest a particular user's role for a particular transaction. The same user can be a non-requesting user in one transaction and the requesting user in a different transaction (e.g., at the same or different times). Even further, though only a single requester is shown for the sake of simplicity, a single transaction can involve multiple requesters, and/or multiple transactions can be processed concurrently such that the network includes many concurrent requesting and non-requesting users. In many transactions, the non-requesting users can become "opportunists," in that they can opportunistically receive multicast content in response to another user's requests. For example, when a subscriber requests content, the content can end up being multicast to the requesting subscriber and one or more non-requesting, opportunist subscribers.

As will be described more fully below, embodiments of the subscriber-side systems 110 are configured to perform various types of functionality using a subscriber optimizer 120. For example, the subscriber optimizer 120 can help manage content requests from subscribers and content delivery to subscribers via subscriber devices. In some implementations, the subscriber optimizer 120 can communicate with the provider optimizer 150 of the provider-side system 140 in such a way as to effectuate advanced optimization functions. For the sake of simplicity, certain client-server types of functionality can be referred to as involving communications over virtual (or logical) communications links, though these "links" can, in fact, include a number of physical links from one or more communications infrastructures. For example, the subscriber optimizer 120 and the provider optimizer 150 can act as a proxy client and a proxy server, respectively, in communication over a proxy tunnel that facilitates acceleration, optimization, and other functionality.

Embodiments of the subscriber-side systems 110 can include subscriber-side communications subsystems 135 as part of, or in communication with, their respective subscriber-side optimizers 120. The subscriber-side communications subsystems 135 can transmit communications to and receive communications from the provider network 185 and can perform any suitable transport-level and/or related processing. For example, when a signal is received from the provider network 185, the subscriber-side communications subsystems 135 can amplify the signal, acquire the carrier, downconvert the signal, etc. Though not explicitly shown, other components and/or component functionality can be provided by the subscriber-side communications subsystems 135. For example, a media access control (MAC) module can provide certain network interface functionality, such as modulating, encoding, filtering, decrypting, and/or otherwise processing data. Other functionality can be provided by routers, switches, and/or the like. These and or other components can also process data upon receipt and/or prior to transmission using techniques, such as modulating and demodulating, encoding and decoding, multiplexing and de-multiplexing, filtering, parsing, packetizing, etc. Embodiments of the subscriber-side communications subsystems 135 can also include other communications functionality for supporting local and/or other networking, such as hub, router, switch, and/or similar functionality for supporting local area (e.g., WiFi) networks, Bluetooth networks, Ethernet networks, femtocells, and/or other wired or wireless networks.

In some embodiments, the subscriber-side systems 110 can include one or more customer premises devices (e.g., set-top boxes, televisions, home network devices, etc.), referred to as "customer premises equipment" or "CPE" 130. The CPEs 130 can provide user interface functionality through which a subscriber can interact with service provisions, for example, by requesting media content, setting preferences, etc. Embodiments can also be configured to implement a home content distribution network (CDN) 125. The home CDN 125 can include any useful types of storage and/or networking components. For example, embodiments of the home CDN 125 can include a single storage device (e.g., a server or disk drive), distributed local storage (e.g., a RAID array, set of servers, etc.), networked storage (e.g., using a local area network, a storage area network, "cloud" storage, or the like), etc. Various embodiments of the subscriber optimizer 120 can be configured to manage (e.g., direct, monitor, etc.) functions of the CPE(s) 130, the home CDN 125, communications among those components, communications between those components and other nodes of the communications system 100, etc.

For added clarity, various functional subsystems are shown. These functional subsystems can be implemented by any suitable system, subsystem, or component shown or by others not shown. Embodiments of the subscriber-side systems 110 include a subscriber-side storage manager subsystem 115 implemented as a functional subsystem of the subscriber optimizer 120. The subscriber-side storage manager subsystem 115 can handle various subscriber side storage functions, including, for example, determining what objects are stored in the home CDN 125, storing objects in and/or removing objects from the home CDN 125, etc.

Some subscriber-side systems 110 can be implemented as subscriber modems (e.g., satellite modems), dedicated devices, hardware or software of set-top boxes, or in any other suitable manner. In one illustrative implementation, the subscriber-side system 110 is embodied in a subscriber modem that includes a subscriber optimizer 120 (e.g., as integrated hardware and/or software) and has one or more ports for communicating with a home CDN 125 and one or more CPEs 130. For example, the subscriber modem has a universal serial bus (USB) port, and the home CDN 125 is implemented on a USB thumb drive. In other implementations, the home CDN 125 can be implemented using internal storage of the modem or as other types of removable storage, networked storage, etc. The CPEs 130 can include televisions or video monitors, computers (e.g., laptops, tablets, etc.), smart phones, smart appliances, and/or any other equipment that can benefit from services provided over the communications infrastructure (and/or support equipment thereto).

Though not shown, embodiments of the subscriber system 110 can include additional functional components. For example, implementations can include request handler functionality, graphical user interface (GUI) functionality, web interface functionality, etc., as separate components and/or as components or functions of the subscriber optimizer 120, one or more CPEs 130, etc. For example, a subscriber can view a website on a web-enabled CPE 130 that displays a number of media content offerings via a GUI (e.g., of a web browser or app). When the subscriber interacts with one of the content offerings (e.g., by clicking on, "mousing over," or otherwise engaging with an icon), the GUI can pass relevant information to request handling functionality of the subscriber optimizer 120, which processes and communicates appropriate request-related information to the provider optimizer 150 of the provider system 140 via the provider network 185. The request can be processed to determine, for example, whether and/or when to communicate the requested content to the subscriber (e.g., whether now or delayed, etc.), how to communicate the content (e.g., whether to multicast, which coding and/or modulation scheme to apply, which carriers and/or spot beams to use, etc.), how much to charge for the content, etc.

Embodiments of the provider-side system 140 can include some or all of a scheduler subsystem 152, a provider-side storage manager subsystem 154, and a recommender subsystem 156, all illustrated as functional subsystems of the provider optimizer 150. Some implementations of the scheduler subsystem 152 seek to optimize both link resources and subscriber engagement from a resource-level (e.g., link-level) perspective. For example, the scheduler subsystem 152 can handle queue prioritization functionality, link scheduling functionality, etc. Some implementations of the provider-side storage manager subsystem 154 seek to optimize both link resources and subscriber engagement from a subscriber-level (e.g., subscriber cluster-level, subscriber cache-level, etc.) perspective. For example, the provider-side storage manager subsystem 154 can maintain cache models (e.g., dictionaries, etc.) of each subscriber's home CDN 125. In some implementations, the provider-side storage manager subsystem 154 can maintain additional information, such as subscriber request histories, content engagement histories, and the like.

Various implementations of the recommender subsystem 156 can provide different functions. In some implementations, the recommender subsystem 156 can maintain global and/or subscriber-level information to facilitate functionality of the scheduler subsystem 152 and/or the provider-side storage manager subsystem 154. For example, the recommender subsystem 156 can use subscriber characteristics (e.g., request and engagement histories, cache contents, subscriber relationships, etc.) to develop content recommendations for subscribers and/or to request content on behalf of subscribers or groups of subscribers for opportunistic delivery. Embodiments described herein focus on functionality of the recommender subsystem 156 relating to offer generation.

For the sake of illustration, embodiments assume each subscriber-side system 110 is associated with one or more subscribers to a media plan (or other communications services plan). Under one illustrative plan, each subscriber has a data allowance policy (DAP) that permits the subscriber a certain amount of resource usage per month (e.g., some number of Gigabytes of download and/or upload data) at any time for any purpose in exchange for a certain monthly fee. The network resources are typically also provisioned for a certain amount of usage by a certain number of subscribers (e.g., a certain minimum rate, for example, in kilobits per second, is provisioned to each subscriber at various times of day). At any given time of day, a dynamically varying amount of link capacity tends to be unused on the provider network 185. For example, implementations of the provider-side system 140 can include a link monitor subsystem 182 (illustrated as being in communication with the provider-side communications subsystem 180), which can monitor a present state of the provider network 185. The link monitor subsystem 182 can help determine how much excess (e.g., opportunistic) capacity is presently available, link quality (e.g., poor link conditions can limit effective capacity if adaptive coding and/or modulation schemes are used for reliable communications), etc. While a portion of this unused capacity is typically reserved for various reasons (e.g., to ensure satisfaction of contractual and/or other promises, like under subscribers' DAPs), some of the dynamically varying, unused capacity can still be considered excess capacity. This excess capacity (or similar types of capacity arising from other types of plans, policies, network architectures, etc.) is referred to herein as "opportunistic" capacity, as various time- and/or demand-shifting techniques can be used to opportunistically exploit at least a portion thereof.

In this context, subscriber requests for content can be categorized as "opportunistic" and "non-opportunistic" types of requests. Non-opportunistic requests are those which the subscriber desires to have fulfilled substantially immediately and for which the subscriber is willing to use capacity under the DAP. For example, the subscriber uses a web browser to stream a movie, and the capacity being used for that movie is accounted for according to the subscriber's monthly allowance under the DAP. By contrast, opportunistic types of requests can include any requests that can be fulfilled using opportunistic capacity. For example, under the media plan, content can be scheduled for anticipatory pre-pushing to subscribers at off-peak times, the subscriber can explicitly request to delay receipt of content at a reduced cost, content can be offered for delivery substantially in real time using presently available capacity, and/or content can be otherwise offered and/or communicated under the media plan in such a way that time-shifts or demand-shifts the communication to exploit opportunistic capacity. Some implementations described herein offer alternate content objects in response to a request, which can effectively time- and/or delay-shift resource usage with respect to the requested content object by exploiting resources that were previously used or already reserved with respect to those alternate content objects.

A request can be considered an opportunistic request regardless of how accounting is applied to fulfilling the request. For example, fulfillment of a request can result in a full or partial accounting against the subscriber's DAP (e.g., a full charge to the subscriber for downloading the requested content) even though it was fulfilled partially or completely using opportunistic capacity. Though not shown, embodiments of the provider-side system 140 can include additional functional blocks (e.g., implemented as part of the provider-side optimizer 150) for handling accounting and provisioning functionality, such as subscriber DAPs (e.g., monthly usage caps, subscriber tiers, loyalty programs, etc.), content pricing, infrastructure costs, etc.

Content objects that are requested in such a manner that can be classified as an opportunistic request are referred to herein as "delayable" objects. Content objects are typically classified as delayable content objects when it is determined that their delivery can be opportunistically delayed (e.g., by explicit request or based on other factors). As illustrated, embodiments of the provider-side system 140 include provider-side storage 170 having subscriber queues 174 and one or more "delaycast" queues 172. The delayable objects can be queued in the delaycast queue 172 for opportunistic delivery over the provider network 185.

Even though they are delayable, their delivery is not necessarily delayed. In some instances (e.g., due to certain available capacity, queue priority, fairness, etc.), a delayable object can be queued for substantially real-time (not delayed) delivery. Suppose a subscriber requests to download a movie over the Internet. In one instance, the subscriber opts to receive the movie now using promised DAP capacity, the movie is scheduled for delivery using that non-opportunistic capacity (e.g., in a subscriber queue 174), and the movie object is not considered a delayable object. In another instance, the subscriber opts for opportunistically delayed delivery of the movie (e.g., in exchange for a discount), the movie is scheduled for delivery at a later timeframe using opportunistic capacity (e.g., in a "watch later" portion of the delaycast queue 172), and the movie object is considered a delayable object. And in another instance, it is determined that the movie can be delivered to the subscriber now using available opportunistic capacity, the movie is scheduled for delivery now using that opportunistic capacity (e.g., in a "watch now" portion of the delaycast queue 172), and the movie object is again considered a delayable object. As described more fully below, content objects in the "watch now" portion of the delaycast queue 172, and certain other content objects, can be considered as part of a present "watch-nowable universe" of content objects.

While various components of the communications system 100 can be used to fulfill non-opportunistic requests and to provide many other types of functionality, the description herein focuses on opportunistic fulfillment of requests. Some such functionality involves proper prioritization of the delaycast queue 172 and/or one or more other queues. For example, scheduler scores generated by the scheduler subsystem 152 and storage scores generated by the provider-side storage manager subsystem 154 can be used to realize concurrent optimizations across the network in both resource utilization and subscriber engagement. Some techniques for delaycast queue 172 prioritization, including certain related functionality of the scheduler subsystem 152 and the provider-side storage manager subsystem 154, are discussed in U.S. patent application Ser. No. 13/830,671, titled "DELAYCAST QUEUE PRIORITIZATION," filed on Mar. 14, 2013, the entire disclosure of which is incorporated by reference herein. For example, queue prioritization techniques can be used to determine which content objects are presently in the watch now portion of the delaycast queue 172, whether a requested content object is a watch-nowable object, etc.

Embodiments described herein can opportunistically handle requests by generating and presenting offers to the requesting subscriber. For example, when a subscriber requests a content object, it can be determined whether the requested object is in the present watch-nowable universe of content objects. If not, embodiments can formulate and deliver an offer to the requesting subscriber in an attempt to encourage the requesting subscriber to choose a less resource-intensive usage of the communications system 100 (e.g., without too large of an impact to the requesting subscriber's, or any other subscribers', happiness). Some types of offers encourage the requesting subscriber to opt to receive the requested content at a later time (e.g., 24 hours later) for a reduced price, for free, etc. Those types of offers, as well as various techniques for presenting the offers and handling corresponding interactions with the offers, are described in U.S. patent application Ser. No. 13/734,584, titled "OPPORTUNISTICALLY DELAYED OFFER AND REQUEST FULFILLMENT," filed on Jan. 5, 2013, the entire disclosure of which is incorporated by reference herein.

Other types of offers present the requesting subscriber with alternate content object selections. For example, when a subscriber requests a content object, it can be determined whether the requested object is in the present watch-nowable universe of content objects. If not, embodiments determine a set of content objects that can be delivered with reduced resource usage (e.g., from the present watch-nowable universe) and that are likely to satisfy the requesting subscriber's present desire for content (e.g., according to the present request, past requests, etc.). For the sake of illustration, in response to a request for a certain content object, a prompt is displayed to the requesting subscriber via a GUI of the CPE 130. The prompt can be represented by any suitable interactive element, such as a button, link, voice prompt, gesture prompt, etc. Through the prompt, the subscriber can interactively opt for delivery of the requested movie at a higher cost or one of a set of alternate media (e.g., movies, television shows, etc.) at a lower cost. In some implementations, all the alternate selections can be offered to the subscriber "for free" (e.g., for no payment, without counting against the subscriber's DAP, etc.). In other implementations, the alternate selections can all be offered at the same non-free discount, offered at different prices (e.g., at different discounts), offered for delivery at different timeframes, or offered in any other suitable manner.

Figure 2:
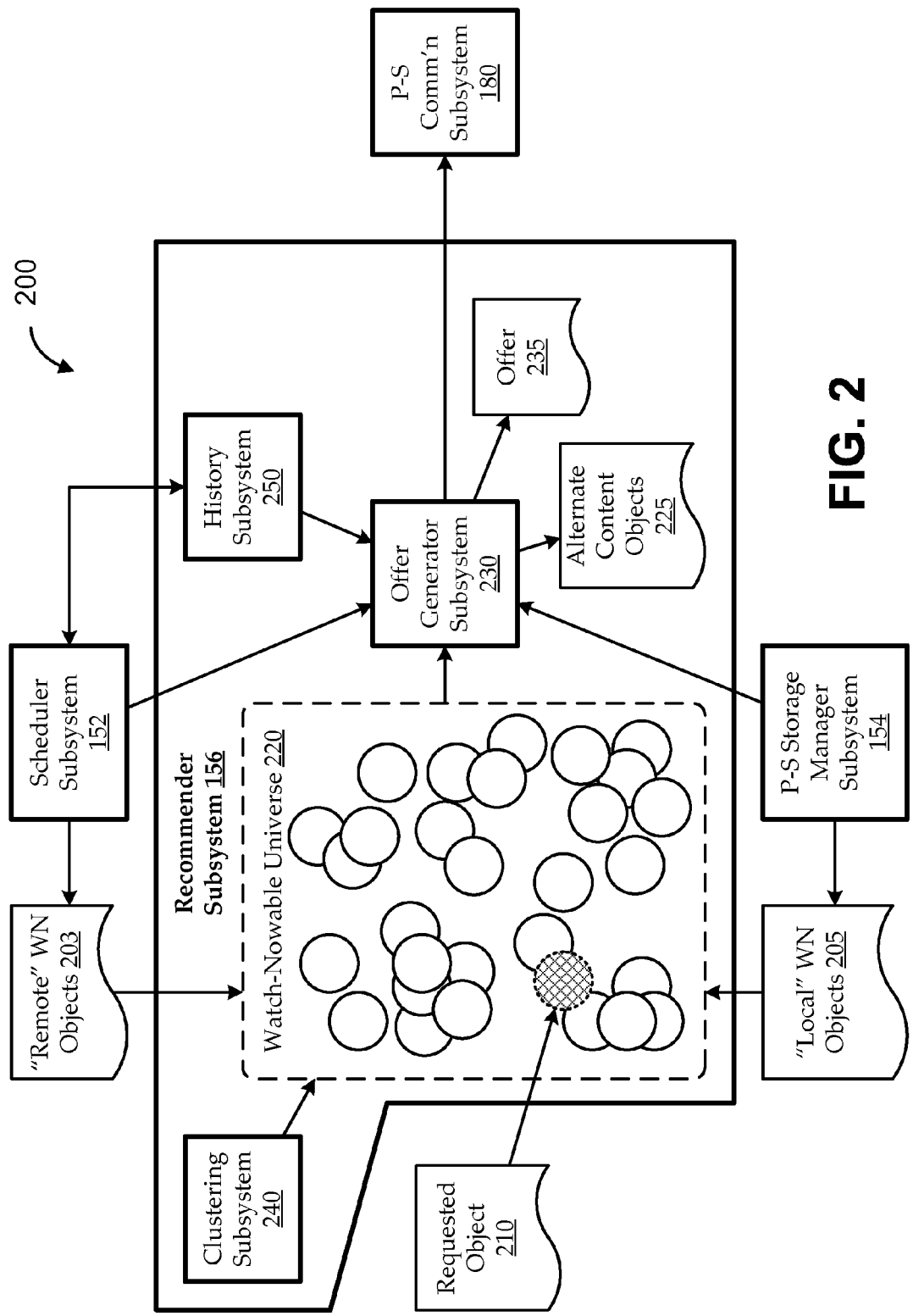
FIG. 2 shows a block diagram of a portion of an illustrative provider-side system, according to various embodiments.

FIG. 2 shows a block diagram of a portion of an illustrative provider-side system 200, according to various embodiments. As illustrated, the provider-side system 200 includes a scheduler subsystem 152, a provider-side storage manager subsystem 154, a recommender subsystem 156, and a provider-side communications subsystem 180, for example, as described with reference to the provider-side system 140 of FIG. 1. As described above, embodiments can include an offer generator subsystem 230 that determines a set of appropriate alternate content objects 225 to present as an offer 235 to a requesting subscriber in response to receiving a request for a requested content object 210. To facilitate that functionality, embodiments of the recommender subsystem 156 can generate and exploit a present watch-nowable universe 220 of content objects.

As used herein, the watch-nowable universe 220 can include any content objects that can be delivered substantially in real time according to present characteristics of the network, for example, including present link resource availability, delaycast queue contents, requesting subscriber cache contents, etc. Some content objects in the watch-nowable universe 220 are those determined to be presently cached local to the requesting subscriber (e.g., in the subscriber's home CDN 125). For example, the subscriber optimizer 120 and/or the provider-side storage manager subsystem 154 can determine the present contents of the subscriber's local cache. These content objects are referred to as "local watch-nowable" content objects 205. Other content objects in the watch-nowable universe 220 are those determined to be presently deliverable to the requesting subscriber over the provider network substantially in real time (e.g., using opportunistic resources). For example, these so-called "remote watch-nowable" content objects 203 can include those content objects determined by the scheduler subsystem 152 to be presently in the watch-now portion of the delaycast queue and/or presently movable into the watch-now portion of the delaycast queue given present link availability. In some implementations, the scheduler subsystem 152 and the provider-side storage manager subsystem 154 can determine objects that are partially stored in the requesting subscriber's local cache for which the remaining portion of the object can be delivered substantially in real time.

In some embodiments, the recommender subsystem 156 can include a clustering subsystem 240 that optimizes the watch-nowable universe 220 according to one or more parameters to facilitate selecting alternate content objects 225 as a function of the requested content object 210. The parameter values can include any descriptive information for classifying the content objects relative to each other. For example, the parameter values can include an object type (e.g., movie), genre, primary actors, director, duration, popularity score (e.g., popularity across all subscribers or a subset of subscribers), similarity to other objects according to a third-party service, consumption score (e.g., how often subscribers who receive the content object actually consume the content object), plot keywords, etc. Some implementations can include parameter values that are a function of provisioning, accounting, or other considerations. For example, when the watch-nowable universe 220 is clustered, content objects can be located with respect to whether the subscriber has a particular tier of service, the subscriber has purchased access to a particular paid media source (e.g., a paid movie network, online sports network, etc.), the subscriber has certain media playback device capabilities (e.g., high-definition displays, mobile media devices, etc.), etc. In general, these various types of parameters can be referred to as "engagement parameters," as they generally indicate (at least in aggregate) a likelihood that a particular subscriber will engage with a particular content object in a particular context (e.g., at a particular time, in response to a particular offer, using a particular device, etc.). For example, each subscriber-side system can have associated engagement characteristics that are applied to the engagement parameters to calculate the engagement relationships between the objects (e.g., respective locations in the watch-nowable universe 220 for that subscriber at that time).

In some implementations, the clustering subsystem 240 can model the watch-nowable universe 220 as a multi-dimensional vector space in which each watch-nowable content object is an element (e.g., a node) located according to a set of the parameter values, which may or may not be weighted. The proximity of any content object to any other content object in the multi-dimensional watch-nowable universe 220 (e.g., by a root-mean-squared distance or other proximity measurement) can be considered a measure of similarity between those content objects. Other optimization techniques can be applied to the watch-nowable universe 220 without departing from the scope of embodiments. In some implementations, the clustering subsystem 240 can calculate object locations in the watch-nowable universe 220 according to the various parameter values, various scalars, and/or various functional relationships. For example, the parameter values can be associated with weighting factors (e.g., virtual tuning knobs) that set functional values to determine the impact of the values on the location of each content object. The weighting factors can effectively tune a linear function, a non-linear function, or any other suitable arithmetic and/or heuristic relationship. For example, artificial neural network approaches can be used with various types of feedback and machine learning, cluster analysis approaches can be used with supporting algorithms (e.g., k-means clustering, expectation-maximization algorithms, etc.), etc. In some implementations, the clustering subsystem 240 can dynamically generate the watch-nowable universe 220 substantially when the request is received and according to characteristic of the requesting subscriber. In this way, the watch-nowable universe 220 can include a substantially real-time representation of the present contents of the requesting subscriber's local cache, present contents of the queues, etc. In other implementations, the clustering subsystem 240 can generate the watch-nowable universe 220 periodically, according to certain simplification and/or assumptions, or in any other suitable manner.

When the request is received for the requested content object 210, embodiments of the offer generator subsystem 230 can virtually locate the requested content object 210 in the present watch-nowable universe 220. This can facilitate a determination of which presently watch-nowable content objects are "closest" to the requested content object 210. Those closest content objects (and/or additional content objects, in some implementations) are used by the offer generator subsystem 230 to generate a set of alternate content objects 225. The alternate content objects 225 can be used to generate an offer 235 that can be presented to the requesting subscriber (e.g., via the provider-side communications subsystem 180), as described above.

In some implementations, various considerations can be used to affect the offer (e.g., to refine the offer terms, determine whether to present the offer at all, etc.). Some embodiments can include a history subsystem 250 that maintains historical information. For example, the history subsystem 250 can maintain information relating to subscriber requests (e.g., request histories, patterns, etc.), fulfillment of request (e.g., number of requests from a particular subscriber that have been fulfilled as watch now versus using alternate selections, delayed delivery, or other techniques), subscriber engagement (e.g., content objects that have been received by the subscriber and not viewed or otherwise consumed), link resource availability, etc. In some implementations, the offer generator subsystem 230 can use this historical information to adjust offers according to fairness, diversity, and or other metrics, for example, as described below.

Figure 3:
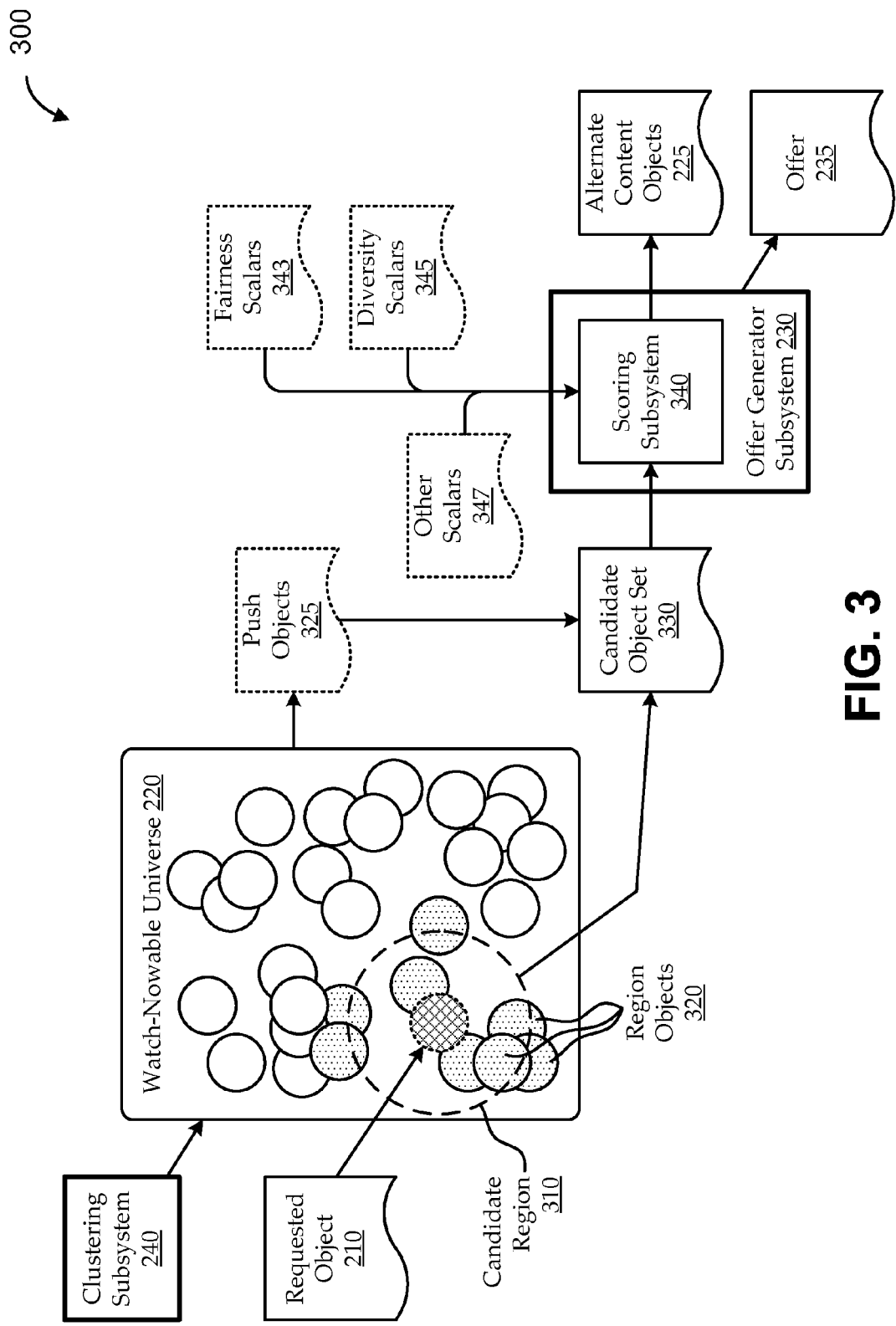
FIG. 3 shows an embodiment of offer generation using components, such as those described with reference to FIG. 2.

For the sake of illustration, FIG. 3 shows an embodiment of offer generation using components, such as those described with reference to FIG. 2. A request is received for a requested content object 210 from a requesting subscriber. A clustering subsystem 240 generates (or updates) a present watch-nowable universe 220, illustrated as a multi-dimensional vector space. The requested content object 210 can be virtually located in the vector space according to parameters of the content object (e.g., descriptors defined in metadata, or the like). As illustrated, a candidate region 310 can be defined. In one implementation, the candidate region 310 is a hypersphere (or other n-dimensional region) having a size selected to define "closest" objects to the requested content object 210. According to one example, the candidate region 310 is defined as a predefined size in each of n dimensions centered around the requested content object 210 (i.e., thereby encompassing whatever number of watch-nowable content objects that happens to be in the resulting region). According to another example, the candidate region 310 is sized in each of n dimensions to encompass a predetermined number of watch-nowable content objects. For example, the size of the candidate region 310 can be expanded or contracted until its boundaries encompass or intersect at least ten watch-nowable objects. Objects falling within the candidate region are illustrated as region objects 320.

Embodiments of the offer generator subsystem 230 can include the region objects 320 in a candidate object set 330. Additional objects (illustrated as "push" objects 325) can also be included in the candidate object set 330. In some implementations, a media provider can have certain content objects that it desires to offer to subscribers whenever appropriate. For example, the media provider can have contractual arrangements with partner media sources to offer designated content offerings to subscribers, even if those offerings are not among the region objects 320. In other implementations, techniques can be used to select diversity objects to include in the candidate object set 330. For example, though falling well outside the candidate region 310, a content object can be selected as a function of a particular dimension (e.g., a content object that is highly dissimilar in most dimensions, but having an identical parameter value in one dimension, such as a same actor). Certain implementations can adjust the size of the candidate region (e.g., in individual dimensions) to achieve similar results.

The offer generator subsystem 230 can cull the candidate object set 330 to generate the set of alternate content objects 225 to include in the offer 235. In some embodiments, the offer generator subsystem 230 can include a scoring subsystem 340 that scores each object in the candidate object set 330 according to a set of scalars. For example, the scoring subsystem 340 can use the same or different techniques for scoring the objects in the candidate object set 330 as the clustering subsystem 240 uses to position the objects in the watch-nowable universe 220. Implementations can apply various types of scalars to affect the offer 235 and/or the alternate content objects 225. As illustrated, the scoring can be affected by fairness scalars 343, diversity scalars 345, and/or other scalars 347. In some implementations, the diversity scalar 345 can be used to ensure that the alternate content objects 225 are not too similar. For example, if a subscriber requests season one of a television program, the most similar alternate selections may be other seasons of the same television program. However, the subscriber may be more satisfied by receiving a more diverse set of alternate options, even if they are technically less similar to the request.

Figure 4:
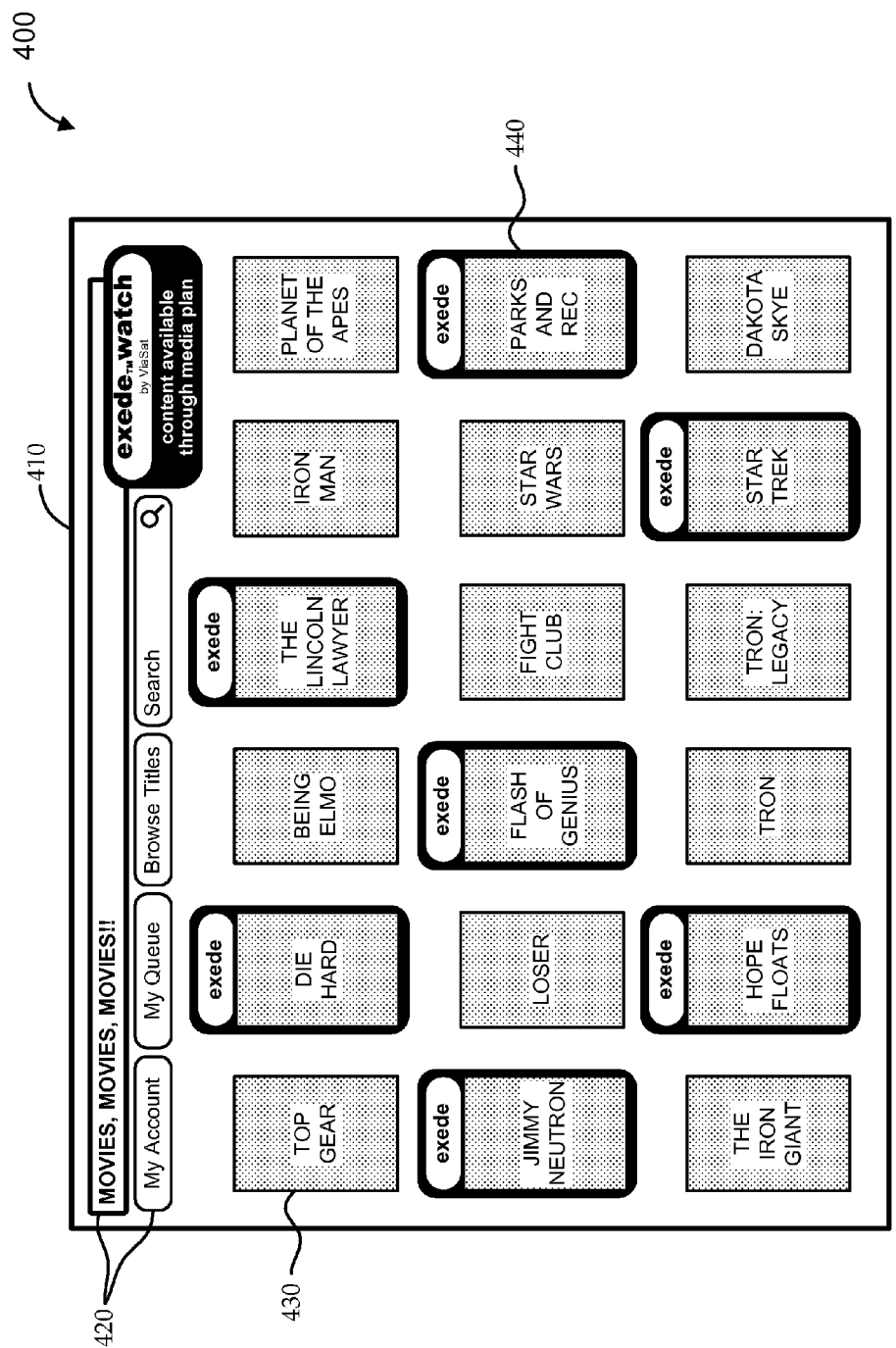
FIG. 4 shows a screenshot of an illustrative media aggregator webpage with certain media plan functionality to provide context for various embodiments.

FIG. 4 shows a screenshot 400 of an illustrative media aggregator webpage 410 with certain media plan functionality to provide context for various embodiments. The webpage 410 includes a number of GUI elements 420, like title bars, navigation buttons, and the like. The webpage 410 also includes a number of icons corresponding to media being offered through the aggregator's site.

For the sake of describing FIG. 4, a scenario is assumed in which the webpage 410 is being accessed by a subscriber to a media plan (illustrated as "Exede™watch"), which gives the subscriber a data allowance policy (DAP) that includes a certain usage allowance per month (e.g., a certain number of Gigabytes that can be used by the subscriber per month). While the subscriber can use the data allowance to access any media (e.g., subject to terms and conditions and/or other policies), the media plan includes features to help the subscriber maximize access to desired media while minimizing the hit to the subscriber's DAP. For example, certain content can be offered with enhanced options under the media plan.

In some implementations, all displayed media options can be made available as part of the media plan. In other implementations, only a subset of the media is part of the media plan. As illustrated, some icons indicate non-plan media 430, while other icons indicate plan media 440 (e.g., "exede" media). According to the assumed scenario, the subscriber can always access any of the offered media (i.e., any non-plan media 430 or plan media 440) at a cost to the subscriber's DAP. When accessing plan media 440, however, additional options are provided that allow the subscriber to watch the media at a later timeframe for a reduced cost to the DAP.

Figure 5:
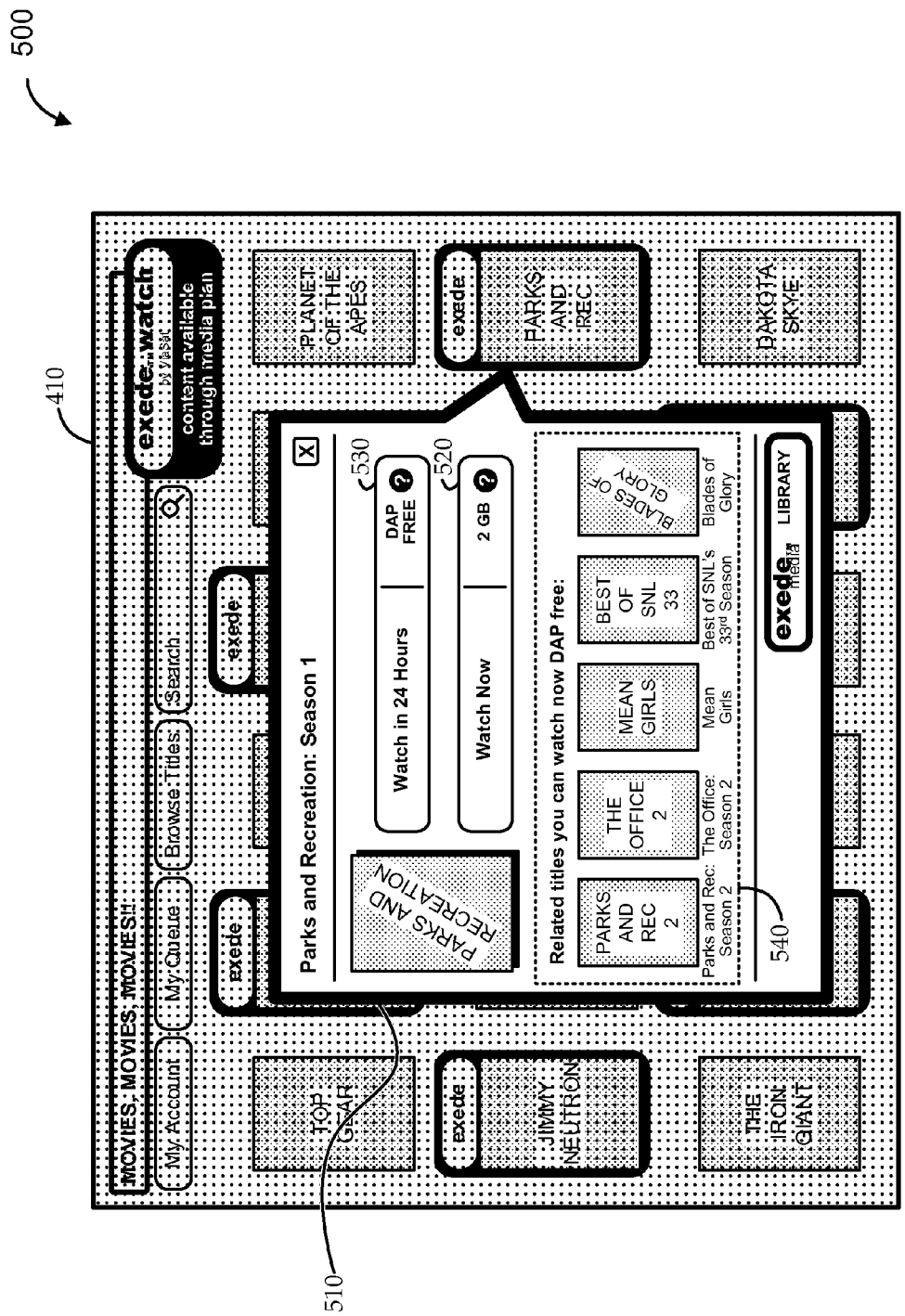
FIG. 5 shows the website of FIG. 4 after an interaction is detected between the subscriber and a plan media icon.

Turning to FIG. 5, the website 410 of FIG. 4 is shown after an interaction is detected between the subscriber and a plan media 440 icon (e.g., by a mouse click, mouse over, remote control selection, or the like). Continuing the assumed scenario described in context of FIG. 4, the subscriber clicks on Season One of the television series "Parks and Recreation," which is indicated as plan media 440 (illustrated with an "exede" box around the movie icon in FIG. 4). In response to the selection, a new GUI element appears as a pop-up 510. The pop-up 510 effectively provides a prompt that allows the user to select among a number of options relating to the selected media.

As illustrated, one option presented in the pop-up 510 (illustrated as button 520) allows the subscriber to watch the selected media now (e.g., stream or download the television program now from the aggregator's website) for an estimated cost of 4 Gigabytes to the subscriber's monthly usage allowance (e.g., according to the subscriber's DAP). In alternative implementations, the cost is presented differently, for example, as an actual cost is presented rather than the estimated cost, in dollars or some currency other than data usage, etc. According to a second illustrated option (illustrated as button 530), the subscriber can watch the selected media later (e.g., download the television program at some later time for storage to the subscriber's home CDN 125), with an estimated delivery time of 24 hours, for no cost to the subscriber's DAP.

A third set of options (illustrated as region 540) allows the subscriber to select an alternate title to watch now for a discounted rate (e.g., for free). As described above, the alternate content objects can be selected from a watch-nowable universe 220, and can include content locally stored in the requesting subscriber's cache, content that can be delivered substantially in real time given present link resource availability and/or other factors, etc. While the GUI is illustrated with five alternate selections, other implementations can have any suitable number of alternate selections presented in any suitable manner (e.g., as a drop-down menu, filterable, sortable, or searchable list, etc.). For the sake of illustration, the alternate selections are reasonably diverse: the first title is Season Two of the same television program as the selected media, which is presently available in the subscriber's home CDN; the second title is Season Two of a similar format television program as the selected media, which is also presently available in the subscriber's home CDN; the third title is a movie in a similar genre having the same lead actress as the selected media, which is presently queued for "watch now" delivery in the delaycast queue; the fourth title is a different format television program in a similar genre and having the same lead actress as the selected media, which is determined to be deliverable substantially in real time according to present link conditions; and the fifth title is another movie in a similar genre having the same lead actress as the selected media, which is partially cached local to the requesting subscriber and for which the remainder can be delivered to the requesting subscriber substantially in real time according to present link conditions.

The GUI and its various elements can be generated in any suitable manner. In some implementations, interactions between the subscriber and a displayed media option (e.g., on a webpage, like the one illustrated in FIG. 4), can be evaluated to determine whether plan media is involved, and/or whether the invoked media is delayable, watch-nowable, etc. The pop-up window 510 (or any other suitable response) can be generated to reflect that selection. For example, user interactions with the interface are handled and/or a suitable response is generated via the interface as described in U.S. patent application Ser. No. 13/558,593, filed Jul. 26, 2012, titled "Page Element Identifier Pre-Classification," which is hereby incorporated by reference in its entirety.

The various systems described above can be implemented in various ways without departing from the scope of embodiments. For example, the functions of the provider-side system 140 and the subscriber-side system 110 can be implemented in hardware and or software, each in a single device, or with functions spread among multiple devices, components, systems, etc. Some implementations can include one or more Application Specific Integrated Circuits (ASICs) adapted to perform a subset of the applicable functions in hardware. Other implementations can have functions performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers. For the sake of illustration, FIGS. 6 and 7 show the subscriber-side optimizer 120 and related functions, and the provider-side optimizer 150 and related functions, implemented in context of respective computational systems.

Figure 6:
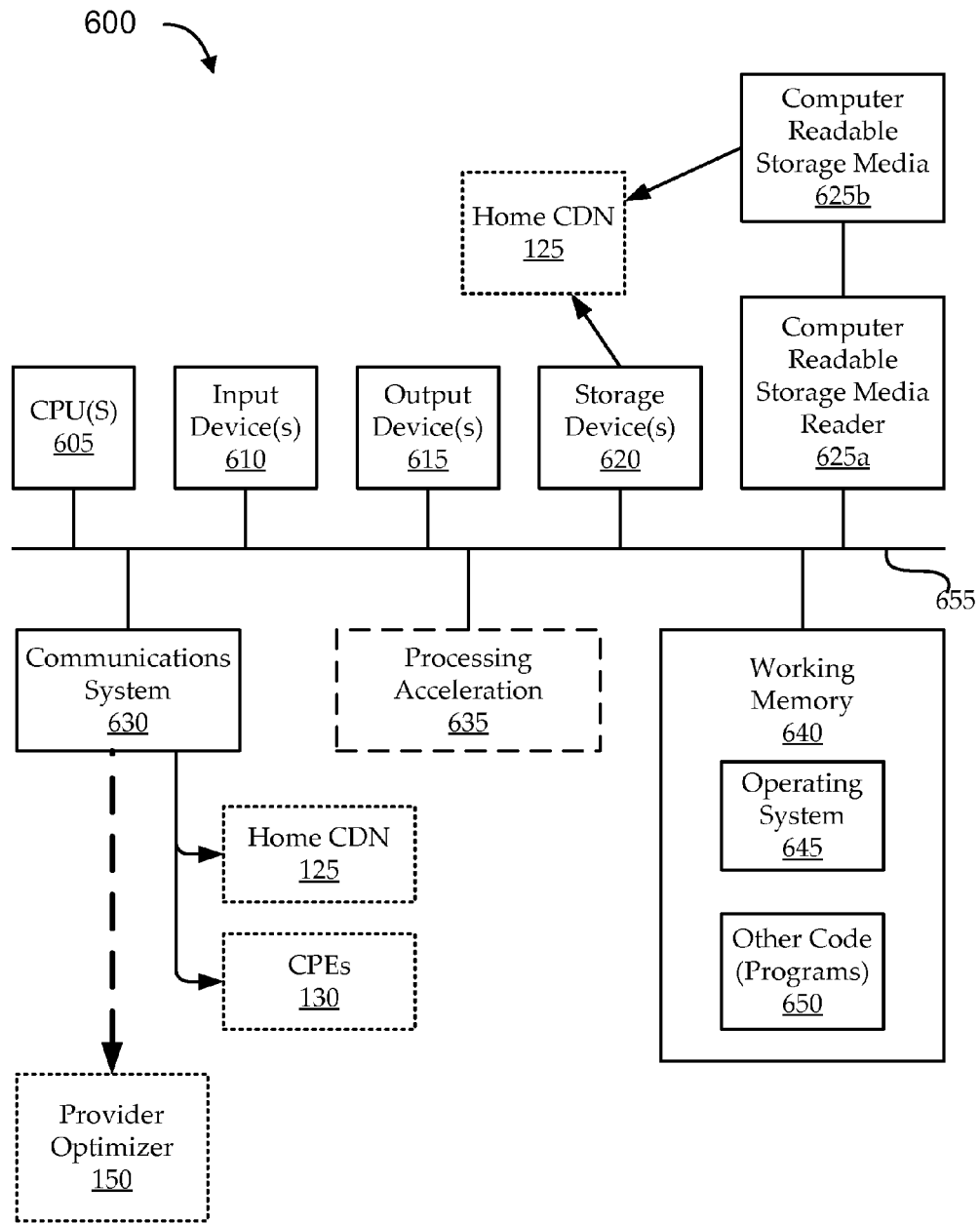
FIG. 6 shows an illustrative computational system for implementing certain subscriber-side functionality, according to various embodiments.
Figure 7:
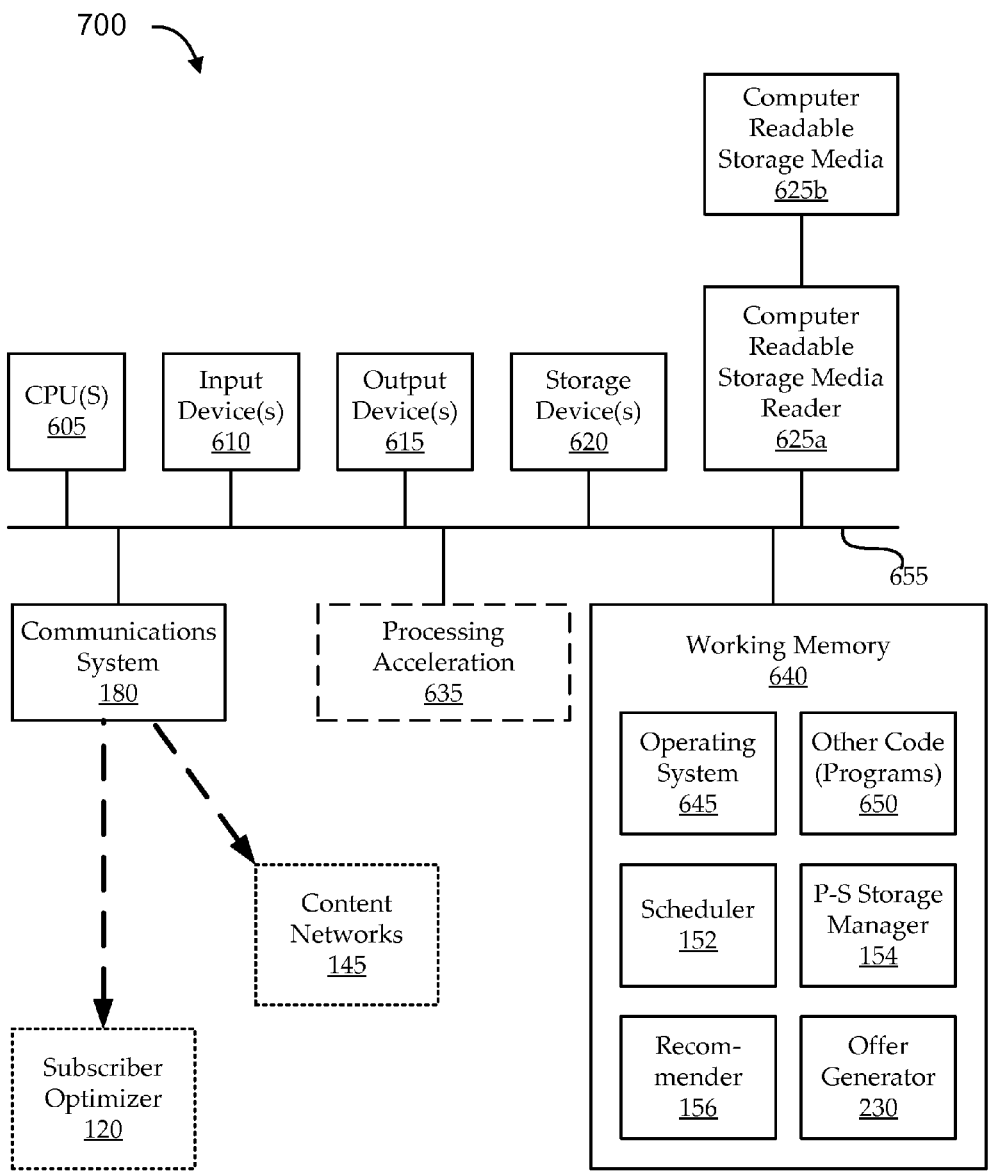
FIG. 7 shows an illustrative computational system for implementing provider-side functionality, according to various embodiments.

FIG. 6 shows an illustrative computational system 600 for implementing certain subscriber-side functionality, according to various embodiments. The computational system 600 can include or perform functionality of components of subscriber optimizer 120 embodiments, such as those described above with reference to FIG. 1. For the sake of simplicity, the computational system 600 is shown including hardware elements that can be electrically coupled via a bus 655. However, embodiments of the computational system 600 can be implemented as or embodied in single or distributed computer systems, in one or more locations, or in any other useful way.

The hardware elements can include one or more central processing units (CPUs) 605, one or more input devices 610 (e.g., a mouse, a keyboard, etc.), and one or more output devices 615 (e.g., a display device, a printer, etc.). The computational system 600 can also include one or more storage devices 620. By way of example, storage device(s) 620 can be disk drives, optical storage devices, solid-state storage device such as a random access memory (RAM) and/or a read-only memory (ROM), which can be programmable, flash-updateable and/or the like. In some embodiments, the storage devices 620 can include or can be in communication with the home CDN 125 of the subscriber system 110, as described above.

The computational system 600 can additionally include a computer-readable storage media reader 625*a*, a communications system 630 (e.g., a modem, a network card (wireless or wired), an infra-red communication device, etc.), and working memory 640, which can include RAM and ROM devices as described above. In some embodiments, the computational system 600 can also include a processing acceleration unit 635, which can include a DSP, a special-purpose processor and/or the like.

The computer-readable storage media reader 625*a* can further be connected to a computer-readable storage medium 625*b*, together (and, optionally, in combination with storage device(s) 620) comprehensively representing remote, local, fixed, and/or removable storage devices plus storage media for temporarily and/or more permanently containing computer-readable information. In some embodiments, the home CDN 125 can be implemented, in whole or in part, as computer-readable storage media 625*b*. The communications system 630 can permit data to be exchanged with a network and/or any other computer described above with respect to the computational system 600. For example, as described with reference to FIG. 1, content traffic and/or other information can be communicated via the communications system 630 to the home CDN 125 (if implemented as a separate one or more components from the subscriber optimizer), one or more CPEs 130, the provider optimizer 150 (e.g., over provider network 185), etc.

The computational system 600 can also include software elements, shown as being currently located within a working memory 640, including an operating system 645 and/or other code 650, such as an application program (which can be a client application, web browser, mid-tier application, relational database management system (RDBMS), etc.). In some embodiments, one or more functions of the subscriber optimizer 120 can be implemented as application code 650 in working memory 640.

FIG. 7 shows an illustrative computational system 700 for implementing provider-side functionality, according to various embodiments. The computational system 700 can include or perform functionality of components of provider optimizer 150 embodiments, such as those described above in FIGS. 1-3. For the sake of simplicity, elements of the computational system 700 that are similar to those of the computational system 600 of FIG. 6 are illustrated with the same reference numerals and are not described again. In some embodiments, however, corresponding components of the computational systems can be implemented differently, according to their different uses, environments, etc. For example, implementations can use residential-grade components in the computational system 600 and commercial-grade components in the computational system 700. Further, while the same basic components and architecture are illustrated, each computational system can be architected as appropriate for its functional and physical context (e.g., in a distributed architecture, such as "the cloud").

The computational system 700 is shown with a number of elements that can be electrically coupled via a bus 655, including one or more CPUs 605, one or more input devices 610, one or more output devices 615, one or more storage devices 620, a computer-readable storage media reader 625*a* (that can be connected to a computer-readable storage medium 625*b*), a communications system 630, a processing acceleration unit 635, and working memory 640. The communications system 630 can permit data to be exchanged with a network and/or any other computer described above with respect to the computational system 700. For example, as described with reference to FIG. 1, content traffic and/or other information can be communicated via the communications system 630 to multiple subscriber optimizers 120 (e.g., over provider network 185) and one or more content networks 145. In some embodiments, one or more functions of the provider optimizer 150 can be implemented as application code 650 in working memory 640. For example, as illustrated, functionality of the scheduler 152, and provider-side storage manager 154, recommender 156, and offer generator 230 can be implemented as code of the working memory 640 (e.g., as part of the other code 650).

It should be appreciated that alternate embodiments of computational systems 600 and 700 can have numerous variations from that described above. For example, customized hardware might also be used and/or particular elements might be implemented in hardware, software (including portable software, such as applets), or both. Further, connection to other computing devices such as network input/output devices can be employed. In various embodiments, computational systems like the ones illustrated in FIGS. 6 and 7 can be used to implement one or more functions of a subscriber optimizer 120 and/or provider optimizer 150, and the computational system is in communication with other functional components as needed or desired. In other embodiments, computational systems like the one illustrated in FIGS. 6 and 7 can be used to implement one or more methods of the system, such as those described below.

Figure 8:
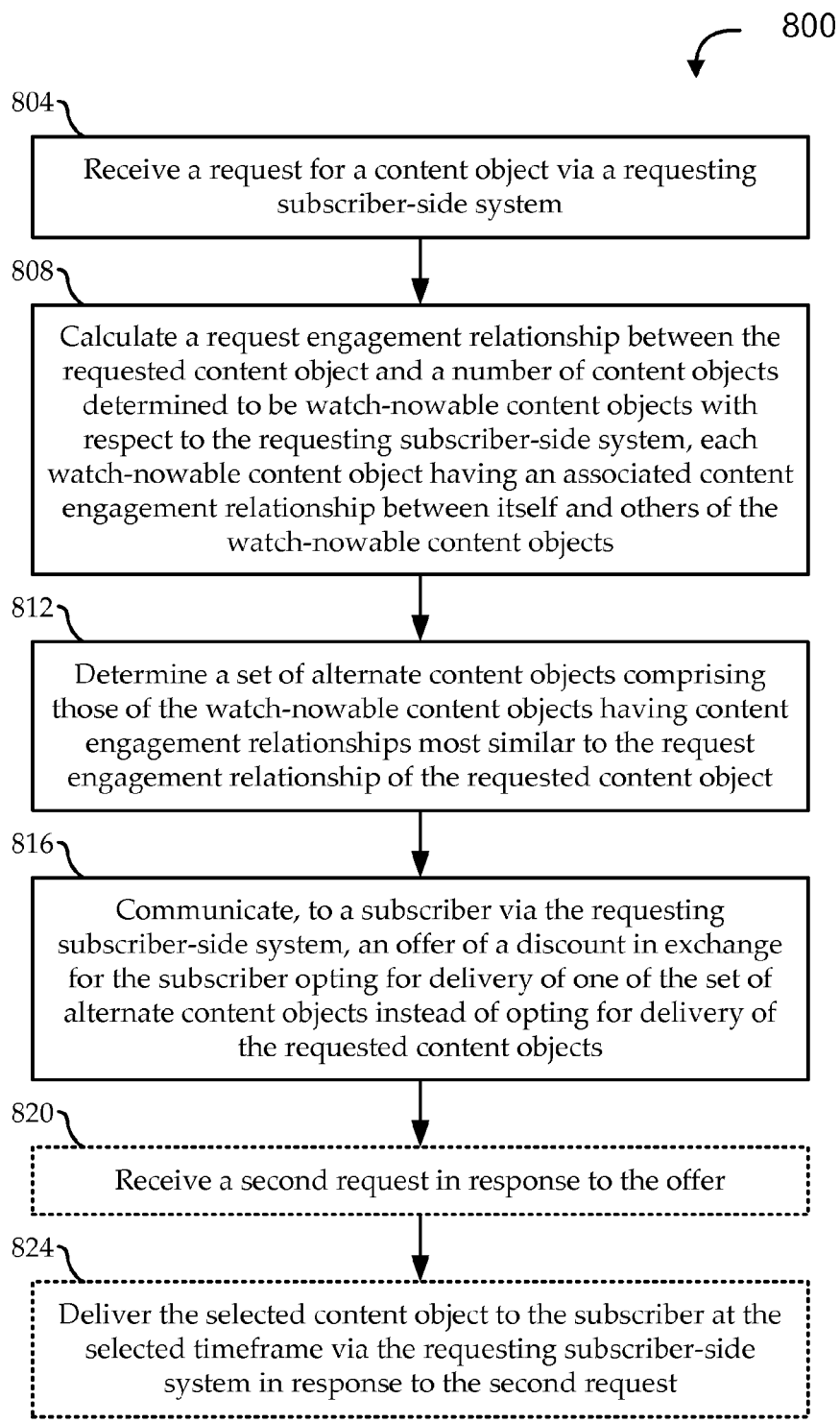
FIG. 8 shows a flow diagram of an illustrative method for subscriber-driven resource shifting, according to various embodiments.

FIG. 8 shows a flow diagram of an illustrative method 800 for subscriber-driven resource shifting, according to various embodiments. The method 800 is described in context of a provider system operating within a communications infrastructure, for example, like the provider systems 140 described above with reference to FIGS. 1-3 and 6. The same or similar techniques can be applied to any type of provider system that operates within a communications infrastructure configured to provide an at least partially shared forward link to at least some of a number of subscriber systems over the link.

Embodiments of the method 800 begin at stage 804 by receiving a request for a content object via a requesting one of a number of subscriber-side systems. For example, a subscriber can use a graphical user interface of a CPE (e.g., a computer, television, smart phone, etc.) to interact with a content listing (e.g., to click on or mouse over an icon or link associated with a movie, television program, video clip, or the like). The request can be processed and communicated by an associated subscriber-side system, via the provider network, to the provider-side system.

At stage 808, embodiments can calculate a request engagement relationship between the requested content object and a number of content objects determined to be watch-nowable content objects with respect to the requesting subscriber-side system (e.g., objects in the present watch-nowable universe). Each watch-nowable content object can have an associated content engagement relationship between itself and others of the watch-nowable content objects. As discussed above, the watch-nowable universe can be modeled in any suitable manner, for example, as a multi-dimensional vector space, so that the content engagement relationships are a function of location in that space (e.g., the content engagement relationship between any two watch-nowable content objects is modeled as the vector distance between those objects in that multi-dimensional space). Similarly, the request engagement relationship between the requested content object and the other objects in the watch-nowable universe can be modeled as the vector distance between the requested content object and each other object in that multi-dimensional space.

In some implementations, the request engagement relationship is only determined (e.g., the method 800 only continues) if the requested content object is first determined not to be a watch-nowable content object. For example, if the requested object is a watch-nowable object, it may be desirable simply to provide the requested object to the requesting subscriber, rather than offering alternate selections. In other embodiments, one or more offers are presented to the requesting subscriber, regardless of whether the requested object is a watch-nowable object. The determination of whether the requested object is watch-nowable can be made in any suitable manner, including as described above. In one example, the requested content object is determined to be a watch-nowable content object when the shared communications link is determined to be in a state that supports substantially real-time delivery of the requested content object via the requesting subscriber-side system.

Similarly, the determination of which other objects are presently in the watch-nowable universe can be made in any suitable manner, including as described above. In one example, at least some of the content objects are determined to be watch-nowable content objects with respect to the requesting subscriber-side system by determining that they are presently stored in a local cache of the requesting subscriber-side system (e.g., according to a subscriber cache model maintained at the provider-side system). In another example, at least some of the content objects are determined to be watch-nowable content objects with respect to the requesting subscriber-side system by determining that a watch-now portion of a queue maintained by the provider-side system is in a state that supports present scheduling of the content objects for communication over the communications infrastructure from the watch-now portion of the queue. In still another example, at least some of the content objects are determined to be watch-nowable content objects with respect to the requesting subscriber-side system by determining that a portion of the content object is not presently stored in a local cache of the requesting subscriber-side system, but that the shared communications link is in a state that supports substantially real-time delivery of the remaining portion (i.e., the portion of the content object not presently stored in the local cache of the requesting subscriber-side system).

At stage 812, a set of alternate content objects can be determined to include those of the watch-nowable content objects having content engagement relationships most similar to the request engagement relationship of the requested content object. In one implementation, a set of region objects is selected to include those watch-nowable content objects having content engagement relationships most similar to the request engagement relationship of the requested content object (e.g., within a defined n-dimensional region of the watch-nowable universe around the location of the requested content object), and the determined set of alternate content objects includes at least one of those region objects. In some embodiments, a predetermined number of alternate content objects can be selected; while in other embodiments, any suitable number of alternate content objects can be selected (e.g., a dynamic number including all the objects that meet certain criteria, a dynamic number based on fairness or other factors, etc.).

Some implementations can determine the set of alternate content objects by identifying candidate alternate content objects as watch-nowable content objects having content engagement relationships most similar to the request engagement relationship of the requested content object, and calculate a candidate score for each candidate alternate content object, according to a set of scalars. The set of alternate content objects is determined to include some (e.g., at least one, a predetermined number, etc.) of the candidate alternate content objects having highest respective candidate scores. Any suitable scalar can be used in the calculation, for example, including a diversity scalar indicating a magnitude of diversity between a respective candidate alternate content object and others of the candidate alternate content objects, a fairness scalar, a local availability scalar indicating an amount of the respective candidate alternate content object presently stored in a local cache of the requesting subscriber-side system, and a promotional scalar indicating a provider-side interest in promoting the respective candidate alternate content object. In one implementation, at least a first scalar is calculated as a function of the content engagement relationship of the watch-nowable content objects and at least a second scalar is calculated not as a function of the content engagement relationship of the watch-nowable content objects. Some implementations can determine the set of alternate content objects to further include at least one additional alternate content object that has a content engagement relationship that represents an outlier relative to the request engagement relationship of the requested content object and the content engagement relationships of the set of alternate content objects.

At stage 816, an offer can be communicated, to a subscriber via the requesting subscriber-side system, that includes at least one discount in exchange for the subscriber opting for delivery of one of the set of alternate content objects instead of opting for delivery of the requested content objects. For example, the alternate content objects can be offered for free or for a reduced cost (e.g., a reduced debit to the requesting subscriber's DAP). In some implementations, the offer can be presented in a pop-up window or other GUI element. In one implementation, the offer includes only the alternate content objects. In another implementation, the offer permits the requesting subscriber to select either receiving the requested content object now (e.g., substantially in real time) for a first cost or receiving one of the alternate content objects now at a reduced cost (e.g., a discount). In still other implementations, additional options are presented. For example, a third option can be presented for delivery of the requested content object at a later timeframe for a third cost (e.g., less than the cost of receiving the requested object now and/or less than receiving one of the alternate content objects). The cost (or discount, etc.) can be presented in any suitable manner. For example, the cost can be presented as a price charged for delivery of the content object, a cost per bit charged to the subscriber for delivery of the content object, a reduced debit to a usage allowance associated with the subscriber's DAP incurred for delivery of the content object, a reduced impact to resource throttling or other service provision under the subscriber's DAP incurred for delivery the content object, etc.

Some embodiments of the method 800 can continue at stage 820 by receiving a second request in response to the offer. For example, the second request can indicate the subscriber's option to watch the requested content object now (e.g., for the higher cost), the subscriber's option to watch the requested content object later (e.g., for a first discount), or the subscriber's option to watch one of the alternate content objects now (e.g., for the same or a second discount). At stage 824, the selected content object can be delivered to the subscriber at the selected timeframe (e.g., now or later) in response to the second request. Depending on the location of the selected content object, the delivery can be via the requesting subscriber-side system, from the subscriber's local cache, etc.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The various operations of methods and functions of certain system components described above can be performed by any suitable means capable of performing the corresponding functions. These means, including embodiments of subscriber system 110 and/or provider system 140 components, can be implemented, in whole or in part, in hardware. Thus, they can include one or more Application Specific Integrated Circuits (ASICs) adapted to perform a subset of the applicable functions in hardware. Alternatively, the functions can be performed by one or more other processing units (or cores), on one or more integrated circuits (ICs). In other embodiments, other types of integrated circuits can be used (e.g., Structured/Platform ASICs, Field Programmable Gate Arrays (FPGAs), and other Semi-Custom ICs), which can be programmed. Each can also be implemented, in whole or in part, with instructions embodied in a computer-readable medium, formatted to be executed by one or more general or application specific controllers. Embodiments can also be configured to support plug-and-play functionality (e.g., through the Digital Living Network Alliance (DLNA) standard), wireless networking (e.g., through the 802.11 standard), etc.

The steps of a method or algorithm or other functionality described in connection with the present disclosure, can be embodied directly in hardware, in a software module executed by a processor, or in a combination of the two. A software module can reside in any form of tangible storage medium. Some examples of storage media that can be used include random access memory (RAM), read only memory (ROM), flash memory, EPROM memory, EEPROM memory, registers, a hard disk, a removable disk, a CD-ROM and so forth. A storage medium can be coupled to a processor such that the processor can read information from, and write information to, the storage medium. In the alternative, the storage medium can be integral to the processor.

A software module can be a single instruction, or many instructions, and can be distributed over several different code segments, among different programs, and across multiple storage media. Thus, a computer program product can perform operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for resource shifting in a communications infrastructure having a provider-side system in communication with a plurality of subscriber-side systems, the method comprising:
   receiving a first request for a content object via a requesting one of a plurality of subscriber-side systems associated with a subscriber;
   determining, by a provider-side system, whether to perform resource shifting in the communications infrastructure in response to a network resource usage calculated from subscriber-side system demands;

calculating, by the provider-side system, a request engagement relationship between the requested content object and a plurality of watch-nowable content objects, wherein the watch-nowable content objects are determined to be watch-nowable content objects with respect to the requesting subscriber-side system as being deliverable to the requesting subscriber-side system substantially in real time according to present characteristics of a network for delivering the plurality of watch-nowable content objects, and each of at least some of the watch-nowable content objects has an associated content engagement relationship between itself and others of the plurality of watch-nowable content objects;

determining, by the provider-side system, a set of alternate content objects comprising those of the plurality of watch-nowable content objects having content engagement relationships most similar to the request engagement relationship of the requested content object; and communicating, to the subscriber via the requesting subscriber-side system, in response to the determined network resource usage and the determined set of alternate content objects an offer of a discount in exchange for the subscriber opting for delivery of one of the set of alternate content objects instead of opting for delivery of the requested content object, the requested content object not being communicated to the requesting subscriber-side system when the offer is received;

receiving, in response to the offer, a second request from the subscriber via the requesting subscriber-side system for a selected content object, such that the selected content object is the requested content object; and delivering the selected content object to the subscriber via the requesting subscriber-side system in response to the second request.

2. The method of claim 1, wherein:
the second request is for a selected one of the alternate content objects that is presently stored in a local cache of the requesting subscriber-side system; and
delivering the selected content object comprises delivering the selected one of the alternate content objects to the subscriber via the local cache of the requesting subscriber-side system.

3. The method of claim 1, further comprising:
determining whether the requested content object is a watch-nowable content object,
wherein the calculating the request engagement relationship, the determining the set of alternate content objects, and the communicating the offer steps are performed only when the requested content object is not a watch-nowable content object.

4. The method of claim 3, wherein the requested content object is determined to be a watch-nowable content object when a shared communications link of the network is determined to be in a state that supports substantially real-time delivery of the requested content object via the requesting subscriber-side system using opportunistic capacity of the network.

5. The method of claim 1, wherein:
the content engagement relationship associated with each watch-nowable content object is represented as a corresponding location in a multi-dimensional vector space calculated according to a set of pre-defined engagement parameters as applied to engagement characteristics associated with the requesting subscriber-side system;
calculating the request engagement relationship comprises calculating a location of the requested content object in the multi-dimensional vector space according to the set of pre-defined engagement parameters as applied to the engagement characteristics associated with the requesting subscriber-side system; and determining the set of alternate content objects comprises determining a subset of the watch-nowable objects having corresponding locations in the multi-dimensional vector space that are closest to the calculated location of the requested content object in the multi-dimensional vector space.

6. The method of claim 1, wherein at least some of the content objects are determined to be watch-nowable content objects with respect to the requesting subscriber-side system by determining that they are presently stored in a local cache of the requesting subscriber-side system.

7. The method of claim 1, wherein at least some of the content objects are determined to be watch-nowable content objects with respect to the requesting subscriber-side system by determining that a watch-now portion of a queue maintained by the provider-side system is in a state that supports present scheduling of the content objects for communication over the communications infrastructure from the watch-now portion of the queue.

8. The method of claim 1, wherein at least some of the content objects are determined to be watch-nowable content objects with respect to the requesting subscriber-side system by:
determining that a portion of the content object is not presently stored in a local cache of the requesting subscriber-side system; and
determining that a shared communications link is in a state that supports substantially real-time delivery of the portion of the content object not presently stored in the local cache of the requesting subscriber-side system.

9. The method of claim 1, wherein:
the request for the content object is received by the provider-side system via the requesting subscriber-side system; and
the provider-side system performs the steps of:
determining that the requested content object is not a watch-nowable content object;
calculating the request engagement relationship; and
determining the set of alternate content objects.

10. The method of claim 9, wherein at least some of the content objects are determined to be watch-nowable content objects with respect to the requesting subscriber-side system by determining that they are presently stored in a local cache of the requesting subscriber-side system according to a model of the local cache maintained by the provider-side system.

11. The method of claim 1, wherein:
the request for the content object is received by a subscriber optimizer of the requesting subscriber-side system; and
the subscriber optimizer performs the steps of:
determining that the requested content object is not a watch-nowable content object; and
communicating the offer to the subscriber via the requesting subscriber-side system.

12. The method of claim 11, wherein the subscriber optimizer further performs the steps of:
calculating the request engagement relationship; and
determining the set of alternate content objects.

13. The method of claim 1, wherein determining the set of alternate content objects comprises selecting a predetermined number of watch-nowable content objects having content engagement relationships most similar to the request engagement relationship of the requested content object.

14. The method of claim 1, wherein determining the set of alternate content objects comprises:
identifying a plurality of candidate alternate content objects as watch-nowable content objects having content engagement relationships most similar to the request engagement relationship of the requested content object;
calculating a candidate score for each candidate alternate content object according to a set of scalars; and
determining the set of alternate content objects as comprising a predetermined number of the candidate alternate content objects having highest respective candidate scores.

15. The method of claim 14, wherein each of the set of scalars is selected from the group consisting of: a diversity scalar indicating a magnitude of diversity between a respective candidate alternate content object and others of the candidate alternate content objects; a local availability scalar indicating an amount of the respective candidate alternate content object presently stored in a local cache of the requesting subscriber-side system; and a promotional scalar indicating a provider-side interest in promoting the respective candidate alternate content object.

16. The method of claim 1, wherein determining the set of alternate content objects comprises:
calculating a candidate score for each of a plurality of watch-nowable content objects according to a set of scalars, wherein at least a first scalar is calculated as a function of the content engagement relationship of the watch-nowable content objects and at least a second scalar is calculated not as a function of the content engagement relationship of the watch-nowable content objects; and
determining the set of alternate content objects as comprising a predetermined number of the watch-nowable content objects having highest respective candidate scores.

17. The method of claim 1, wherein determining the set of alternate content objects further comprises:
identifying an additional alternate content object having a content engagement relationship that represents an outlier relative to the request engagement relationship of the requested content object and the content engagement relationships of the set of alternate content objects.

18. The method of claim 1, wherein:
the request for the content object is received via a graphical user interface displayed on a subscriber interface device of the requesting subscriber-side system; and
the offer is communicated to the subscriber via the graphical user interface.

19. The method of claim 1, wherein:
the offer comprises a first option for delivery of the requested content object substantially in real time for a first cost and a second option for delivery of any of the set of alternate content objects substantially in real time for a second cost, wherein the discount represents a difference between the first cost and the second cost.

20. The method of claim 19, wherein:
the offer further comprises a third option for delivery of the requested content object at a later timeframe for a third cost that is less than at least the first cost.

21. A provider-side system for resource shifting in a communications infrastructure in communication with a plurality of subscriber-side systems, the system comprising:
a provider-side subsystem that determines whether to perform resource shifting in the communications infrastructure in response to a network resource usage calculated from subscriber-side system demands;
a offer generator subsystem that:
calculates a request engagement relationship between a requested content object and a plurality of content objects determined to be watch-nowable content objects with respect to a requesting subscriber-side system associated with a subscriber, each of at least some of the watch-nowable content objects having an associated content engagement relationship between itself and others of the plurality of watch-nowable content objects;
determines a set of alternate content objects comprising those of the plurality of watch-nowable content objects having content engagement relationships most similar to the request engagement relationship of the requested content object; and
communicates, to the subscriber via the requesting subscriber-side system, in response to the determined network resource usage and the determined set of alternate content objects an offer of a discount in exchange for the subscriber opting for delivery of one of the set of alternate content objects instead of opting for delivery of the requested content object, the requested content object not being communicated to the requesting subscriber-side system when the offer is received,
wherein the offer generation subsystem further models the plurality of watch-nowable content objects as being within a multi-dimensional vector space wherein the content engagement relationship associated with each of the watch-nowable content objects is represented as a corresponding location in the multi-dimensional vector space calculated according to a set of pre-defined engagement parameters as applied to engagement characteristics associated with the requesting subscriber-side system, and
wherein the offer generation subsystem calculates the request engagement relationship by modeling a location of the requested content object in the multi-dimensional vector space according to the set of pre-defined engagement parameters as applied to the engagement characteristics associated with the requesting subscriber-side system.

22. The system of claim 21, further comprising:
a communications subsystem that:
receives a substitute request for a selected one of the alternate content objects from the subscriber in response to the offer; and
delivers the selected one of the alternate content objects to the subscriber via a shared communications link and the requesting subscriber-side system in response to the substitute request.

23. The system of claim 21, further comprising:
a communications subsystem that:
receives a substitute request for a selected one of the alternate content objects from the subscriber in response to the offer; and directs the requesting subscriber-side system to deliver the selected one of the alternate content objects to the subscriber from subscriber-side content storage in response to the substitute request.

24. The system of claim 21, wherein the offer generation subsystem:
determines the set of alternate content objects by determining a subset of the watch-nowable objects having corresponding locations in the multi-dimensional vector space that are closest to the calculated location of the requested content object in the multi-dimensional vector space.

25. The system of claim 21, wherein the offer generation subsystem determines the set of alternate content objects by:
identifying a plurality of candidate alternate content objects according to respective positions of the watch-nowable content objects and the requested content object in the multi-dimensional vector space;
calculating a candidate score for each candidate alternate content object according to a set of scalars; and
determining the set of alternate content objects to include at least a predetermined number of the candidate alternate content objects having highest respective candidate scores.

26. The system of claim 21, further comprising:
a communications subsystem that:
receives a substitute request for a selected content object, such that the selected content object is the requested content object from the subscriber in response to the offer; and
delivers the selected content object to the subscriber via a shared communications link and the requesting subscriber-side system in response to the substitute request.

27. A method for resource shifting in a communications infrastructure having a provider-side system in communication with a plurality of subscriber-side systems, the method comprising:
receiving a request for a content object via a requesting one of a plurality of subscriber-side systems associated with a subscriber;
determining, by a provider-side system, whether to perform resource shifting in the communications infrastructure in response to a network resource usage calculated from subscriber-side system demands;
calculating, by the provider-system, a request engagement relationship between the requested content object and a plurality of watch-nowable content objects, wherein the watch-nowable content objects are determined to be watch-nowable content objects with respect to the requesting subscriber-side system, and each of at least some of the watch-nowable content objects has an associated content engagement relationship between itself and others of the plurality of watch-nowable content objects;
determining, by the provider-system, a set of alternate content objects comprising those of the plurality of watch-nowable content objects having content engagement relationships most similar to the request engagement relationship of the requested content object;
communicating, to the subscriber via the requesting subscriber-side system, in response to the determined network resource usage and the determined set of alternate content objects an offer of a discount in exchange for the subscriber opting for delivery of one of the set of alternate content objects instead of opting for delivery of the requested content object;
wherein determining the set of alternate content objects comprises: identifying a plurality of candidate alternate content objects as watch-nowable content objects having content engagement relationships most similar to the request engagement relationship of the requested content object;
calculating a candidate score for each candidate alternate content object according to a set of scalars;
determining the set of alternate content objects as comprising a predetermined number of the those of the candidate alternate content objects having highest respective candidate scores; and
wherein each of the set of scalars includes a diversity scalar indicating a magnitude of diversity between a respective candidate alternate content object and others of the candidate alternate content objects, to ensure that the alternate content objects are not too similar.

* * * * *